(12) United States Patent
Nishioka et al.

(10) Patent No.: US 12,246,378 B2
(45) Date of Patent: Mar. 11, 2025

(54) METAL SOLID PRODUCTION METHOD

(71) Applicant: K.K. SUN METALON, Kawasaki (JP)

(72) Inventors: Kazuhiko Nishioka, Kawasaki (JP); Koji Kageyama, Kawasaki (JP)

(73) Assignee: K.K. SUN METALON, Kanagawa (JP)

( * ) Notice: Subject to any disclaimer, the term of this patent is extended or adjusted under 35 U.S.C. 154(b) by 0 days.

(21) Appl. No.: 18/404,797

(22) Filed: Jan. 4, 2024

(65) Prior Publication Data
US 2024/0165706 A1  May 23, 2024

Related U.S. Application Data

(63) Continuation of application No. 18/550,677, filed as application No. PCT/JP2022/011575 on Mar. 15, 2022.

(30) Foreign Application Priority Data
Mar. 15, 2021 (JP) .................. 2021-041553

(51) Int. Cl.
*B22F 10/22* (2021.01)
*B22F 1/12* (2022.01)
(Continued)

(52) U.S. Cl.
CPC .............. *B22F 10/22* (2021.01); *B22F 1/12* (2022.01); *B22F 3/004* (2013.01); *B22F 3/14* (2013.01);
(Continued)

(58) Field of Classification Search
CPC .... B22F 3/16; B22F 3/004; B22F 3/24; B22F 5/00; B22F 7/02; B22F 9/20;
(Continued)

(56) References Cited

U.S. PATENT DOCUMENTS 5,702,501 A   12/1997  Osawa et al.
6,544,315 B2   4/2003  Har-Shai
(Continued)

FOREIGN PATENT DOCUMENTS

CN   101323529 A   12/2008
CN   103882423 A   6/2014
(Continued)

OTHER PUBLICATIONS

Bansal, Amit et al., "Characterization of bulk stainless steel joints developed through microwave hybrid heating," Materials Characterization, May 2014. vol. 91, pp. 34-41.
(Continued)

*Primary Examiner* — Ricardo D Morales
(74) *Attorney, Agent, or Firm* — Knobbe, Martens, Olson & Bear, LLP

(57) ABSTRACT

Provided is a method for producing a metal solid, the method being capable of easily producing a metal solid. A method for producing a metal solid, the method comprising covering at least a portion of the periphery of a metal powder with a high-melting-point material having a melting point higher than the melting point of the metal powder; and irradiating the metal powder, at least a portion of the periphery of which is covered with the high-melting-point material, with microwaves to heat the metal powder, thereby sintering or melt-solidifying the metal powder.

16 Claims, 19 Drawing Sheets

(51) Int. Cl.

| | | |
|---|---|---|
| *B22F 3/00* | (2021.01) | |
| *B22F 3/14* | (2006.01) | |
| *B22F 3/16* | (2006.01) | |
| *B22F 3/24* | (2006.01) | |
| *B22F 5/00* | (2006.01) | |
| *B22F 7/02* | (2006.01) | |
| *B22F 9/20* | (2006.01) | |
| *B22F 10/10* | (2021.01) | |
| *B22F 10/20* | (2021.01) | |
| *B22F 10/25* | (2021.01) | |
| *B22F 10/66* | (2021.01) | |
| *B22F 12/41* | (2021.01) | |
| *B22F 12/50* | (2021.01) | |
| *B22F 12/60* | (2021.01) | |
| *B22F 12/70* | (2021.01) | |
| *B23K 1/005* | (2006.01) | |
| *B33Y 10/00* | (2015.01) | |
| *B33Y 30/00* | (2015.01) | |
| *B33Y 70/10* | (2020.01) | |
| *B22F 3/105* | (2006.01) | |

(52) U.S. Cl.
CPC ............... *B22F 3/16* (2013.01); *B22F 3/24* (2013.01); *B22F 5/00* (2013.01); *B22F 7/02* (2013.01); *B22F 9/20* (2013.01); *B22F 10/10* (2021.01); *B22F 10/20* (2021.01); *B22F 10/25* (2021.01); *B22F 10/66* (2021.01); *B22F 12/41* (2021.01); *B22F 12/50* (2021.01); *B22F 12/60* (2021.01); *B22F 12/70* (2021.01); *B23K 1/005* (2013.01); *B33Y 10/00* (2014.12); *B33Y 30/00* (2014.12); *B33Y 70/10* (2020.01); *B22F 2003/1054* (2013.01); *B22F 2201/01* (2013.01); *B22F 2201/10* (2013.01); *B22F 2201/50* (2013.01); *B22F 2202/11* (2013.01); *B22F 2301/052* (2013.01); *B22F 2301/35* (2013.01); *B22F 2998/10* (2013.01); *B22F 2999/00* (2013.01); *C04B 2237/34* (2013.01); *C04B 2237/363* (2013.01)

(58) Field of Classification Search
CPC ............. B22F 2201/01; B22F 2201/10; B22F 2201/50; B22F 2202/11; B22F 2301/052; B22F 2301/35; B22F 2998/10; B22F 2999/00

See application file for complete search history.

(56) References Cited

U.S. PATENT DOCUMENTS

| | | | |
|---|---|---|---|
| 10,682,699 | B2 | 6/2020 | Martin et al. |
| 10,960,497 | B2 | 3/2021 | Yahata et al. |
| 2009/0039572 | A1 | 2/2009 | Nagata et al. |
| 2014/0087210 | A1* | 3/2014 | Keane ............... B22F 1/18 428/548 |
| 2015/0054204 | A1 | 2/2015 | Tseliakhovich et al. |
| 2016/0158828 | A1 | 6/2016 | Tanaka |
| 2017/0165791 | A1 | 6/2017 | Kamachi et al. |
| 2018/0162048 | A1* | 6/2018 | Gibson ............... C09D 123/12 |
| 2018/0178447 | A1 | 6/2018 | Abbott, Jr. et al. |
| 2018/0221950 | A1 | 8/2018 | Mark |
| 2018/0265417 | A1* | 9/2018 | Champion ............ C04B 35/01 |
| 2019/0134713 | A1 | 5/2019 | Abbott, Jr. et al. |
| 2020/0047252 | A1 | 2/2020 | Kritchman et al. |
| 2023/0271248 | A1 | 8/2023 | Myrick |

FOREIGN PATENT DOCUMENTS

| | | | |
|---|---|---|---|
| CN | 107262714 A | | 10/2017 |
| JP | 2009-035776 A | | 2/2009 |
| JP | 2012-158790 A | | 8/2012 |
| JP | 2013-216943 A | | 10/2013 |
| JP | 2017-110294 A | | 6/2017 |
| JP | 2017-145151 A | | 8/2017 |
| JP | 2018-144086 A | | 9/2018 |
| JP | 2020-517824 A | | 6/2020 |
| JP | 2020151993 A | * | 9/2020 |

OTHER PUBLICATIONS

International Search Report and Written Opinion received in PCT Application No. PCT/JP2022/011575, dated May 24, 2022 in 16 pages.

Tamang Siddharth et al.: "Brazing of cBN to WC—Co by Ag—Cu—In—Ti alloy through microwave hybrid heating for cutting tool application", Materials Letters, Elsevier, Amsterdam, NL, vol. 254, Jul. 13, 2019 (Jul. 13, 2019), pp. 145-148,XP085810263, ISSN: 0167-577X, DOI:10.1016/J.MATLET.2019.07.041.

* cited by examiner

Fig. 6
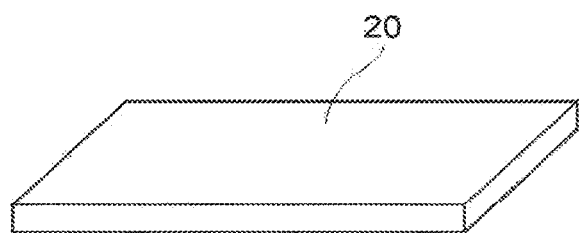
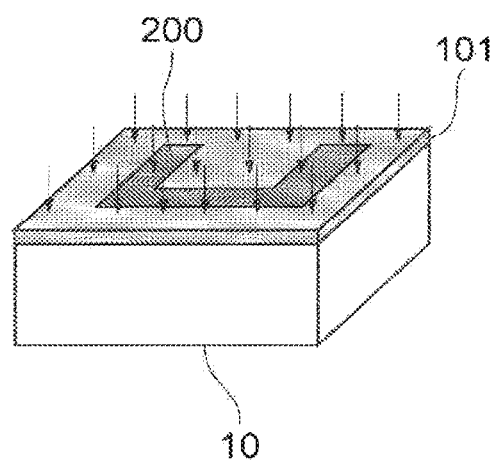

METAL SOLID PRODUCTION METHOD

TECHNICAL FIELD

The present disclosure relates to a method for producing a metal solid.

BACKGROUND

Conventionally, metal solid parts used in daily necessities, home electric appliances, machine tools, and the like are produced by processing ingots, metal steel pieces, etc. Processes of processing ingots and metal steel pieces are complicated, including various steps. Processes of processing ingots and metal steel pieces may involve various processing companies. Accordingly, processes of processing ingots and metal steel pieces may involve logistical transport therein. Therefore, processes of processing ingots and metal steel pieces are expensive. If one step is disrupted in processes of processing ingots and metal steel pieces, all downstream steps may be disrupted.

CITATION LIST

Patent Literature

Patent Literature 1: Japanese Patent Laid-Open No. 2012-158790
Patent Literature 2: Japanese Patent Laid-Open No. 2017-145151
Patent Literature 3: Japanese Patent Laid-Open No. 2009-035776
Patent Literature 4: Japanese Patent Laid-Open No. 2013-216943
Patent Literature 5: Japanese Patent Laid-Open No. 2017-145151

SUMMARY

Technical Problem

An object of the present disclosure is to provide a method for producing a metal solid, the method being capable of easily producing a metal solid.

Solution to Problem

An aspect of the present disclosure provides a method for producing a metal solid, the method including covering at least a portion of the periphery of a metal powder with a high-melting-point material having a melting point higher than the melting point of the metal powder; and irradiating the metal powder, at least a portion of the periphery of which is covered with the high-melting-point material, with microwaves to heat the metal powder, thereby sintering or melt-solidifying the metal powder.

In the above method for producing a metal solid, the covering at least a portion of the periphery of the metal powder with the high-melting-point material, and the sintering or melt-solidifying the metal powder may be repeated.

In the above method for producing a metal solid, laminated metal solids may be formed.

In the above method for producing a metal solid, the high-melting-point material may include an insulation material that has a lower degree of absorption of the microwaves than the metal powder.

In the above method for producing a metal solid, the high-melting-point material may include an absorbent material that absorbs the microwaves in a temperature zone at least a portion of which is lower than a temperature zone in which the metal powder absorbs the microwaves.

In the above method for producing a metal solid, the high-melting-point material may include an insulation material that has a lower degree of absorption of the microwaves than the metal powder; and an absorbent material that absorbs the microwaves in a temperature zone at least a portion of which is lower than a temperature zone in which the metal powder absorbs the microwaves.

In the above method for producing a metal solid, the high-melting-point material may include from 1 mass % to 70 mass % of the absorbent material.

In the above method for producing a metal solid, the insulation material may include an oxide.

In the above method for producing a metal solid, the insulation material may include at least one selected from the group consisting of aluminum oxide, silicon oxide, magnesium oxide, zirconium oxide, and titanium oxide.

In the above method for producing a metal solid, the absorbent material may include a carbon material.

In the above method for producing a metal solid, the absorbent material may include at least one selected from the group consisting of carbon, graphite, silicon carbide, carbon resin, and metal carbide.

In the above method for producing a metal solid, the metal powder may include a metal.

In the above method for producing a metal solid, the metal powder may include at least one selected from the group consisting of iron, nickel, copper, gold, silver, aluminum, and cobalt.

In the above method for producing a metal solid, the metal powder may include a metal compound.

In the above method for producing a metal solid, the metal powder may include a compound of at least one selected from the group consisting of iron, nickel, copper, gold, silver, aluminum, and cobalt.

In the above method for producing a metal solid, the metal powder may further include an alloy component.

In the above method for producing a metal solid, the alloy component may include at least one selected from the group consisting of silicon, manganese, chromium, nickel, carbon, boron, copper, aluminum, titanium, niobium, vanadium, zinc, and sulfur.

In the above method for producing a metal solid, the metal powder may have an average particle size of 200 μm or less.

In the above method for producing a metal solid, the metal powder may include a metal oxide, and the metal powder may be reduced in the irradiation of the metal powder with microwaves.

In the above method for producing a metal solid, the metal powder may include a metal oxide, and the metal powder may be sintered in the irradiation of the metal powder with microwaves.

In the above method for producing a metal solid, the high-melting-point material may be in the form of a mold or a container.

In the above method for producing a metal solid, the metal powder may be in the form of a green compact.

The method for producing a metal solid may further include applying a pressure to the metal powder before irradiating the metal powder with microwaves.

In the above method for producing a metal solid, the pressure may be from 1 MPa to 2000 MPa.

The method for producing a metal solid may further include applying a pressure to the metal powder after irradiating the metal powder with microwaves.

In the above method for producing a metal solid, the pressure may be from 1 MPa to 2000 MPa.

In the above method for producing a metal solid, the irradiating the metal powder with microwaves may be performed in an inert gas atmosphere.

In the above method for producing a metal solid, the irradiating the metal powder with microwaves may be performed in a reducing atmosphere.

In the above method for producing a metal solid, the metal powder may include a metal oxide, and the method may further include reducing the metal oxide before irradiating the metal powder with microwaves.

In the above method for producing a metal solid, the covering at least a portion of the periphery of the metal powder with a high-melting-point material having a melting point higher than the melting point of the metal powder may include forming a layer of the high-melting-point material; forming a recess in the layer of the high-melting-point material; and placing the metal powder in the recess.

In the above method for producing a metal solid, the forming the recess in the layer of the high-melting-point material may include curing a portion of the layer of the high-melting-point material; and removing an uncured portion of the layer of the high-melting-point material.

In the above method for producing a metal solid, the curing the portion of the layer of the high-melting-point material may include incorporating a curable material into the portion of the layer of the high-melting-point material.

In the above method for producing a metal solid, the portion of the layer of the high-melting-point material may be impregnated with the curable material.

In the above method for producing a metal solid, the portion of the layer of the high-melting-point material may be cured by light irradiation.

Another aspect of the present disclosure provides a device for producing a metal solid, the device including a stage on which a metal powder and a high-melting-point material covering at least a portion of the periphery of the metal powder and having a melting point higher than the melting point of the metal powder are placed; and a microwave irradiator for irradiating the metal powder, at least a portion of the periphery of which is covered with the high-melting-point material, with microwaves to heat the metal powder, thereby sintering or melt-solidifying the metal powder.

The above device for producing a metal solid may further include a high-melting-point material placement unit for placing the high-melting-point material on the stage.

In the above device for producing a metal solid, the high-melting-point material placement unit may apply the high-melting-point material onto the stage.

In the above device for producing a metal solid, the high-melting-point material placement unit may laminate a layer of the high-melting-point material on the stage.

The above device for producing a metal solid may further include a curable material addition unit for adding a curable material to at least a portion of the high-melting-point material.

The above device for producing a metal solid may further include a curing device for curing at least a portion of the high-melting-point material.

The above device for producing a metal solid may further include an uncured material remover for removing the high-melting-point material that is uncured.

The above device for producing a metal solid may further include a metal powder placement unit for placing the metal powder on the stage.

In the above device for producing a metal solid, the metal powder placement unit may apply the metal powder onto the stage.

In the above device for producing a metal solid, the metal powder placement unit may place the metal powder in a recess of the high-melting-point material.

The above device for producing a metal solid may further include a pressurizer for applying a pressure to the metal powder placed on the stage.

In the above device for producing a metal solid, the pressurizer may apply a pressure to the metal powder before the microwave irradiator irradiates the metal powder with microwaves.

In the above device for producing a metal solid, the pressurizer may apply a pressure to the metal powder after the microwave irradiator irradiates the metal powder with microwaves.

The above device for producing a metal solid may further include an inert gas supplier for supplying an inert gas to the metal powder.

The above device for producing a metal solid may further include a reducing gas supplier for supplying a reducing gas to the metal powder.

The above device for producing a metal solid may further include a high-melting-point material placement unit for placing the high-melting-point material on the stage; and a metal powder placement unit for placing the metal powder on the stage, wherein (1) the high-melting-point material placement unit and the metal powder placement unit may place the metal powder surrounded by the high-melting-point material on the stage, and (2) the microwave irradiator may sinter or melt-solidify the metal powder. The device for producing a metal solid may repeat a combination of (1) and (2).

In the above device for producing a metal solid, the metal powder may include a metal oxide, and the device may further include a reduction device that reduces the metal oxide before the microwave irradiator irradiates the metal powder with microwaves.

Advantageous Effect of Invention

According to the present disclosure, it is possible to provide a method for producing a metal solid, the method being capable of easily producing a metal solid.

BRIEF DESCRIPTION OF DRAWINGS

FIG. 6 is a schematic process diagram of a method for producing a metal solid according to an embodiment.

DESCRIPTION OF EMBODIMENTS

Figure 1:
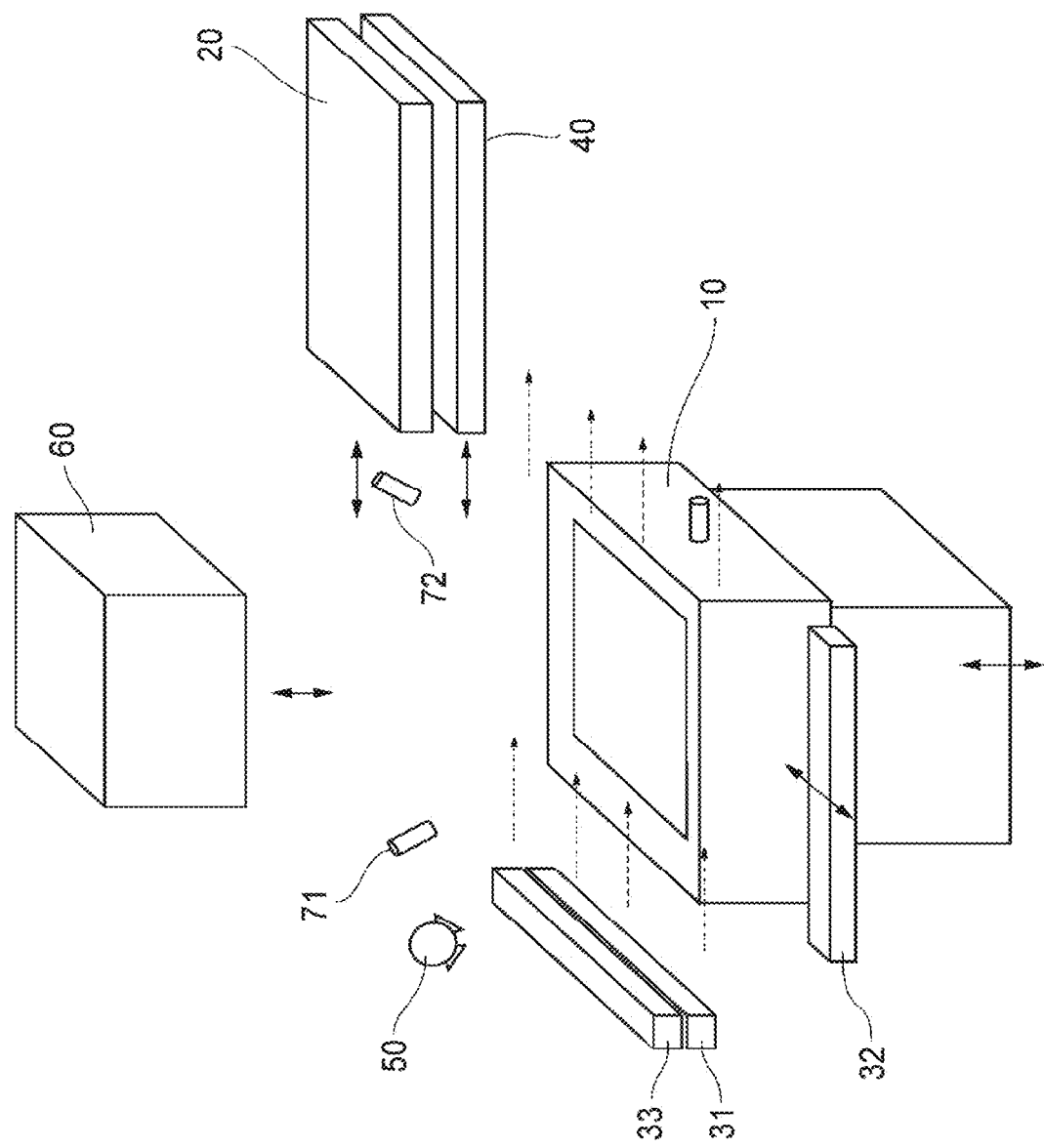
FIG. 1 is a schematic perspective view of a device for producing a metal solid according to an embodiment.

An embodiment of the present disclosure will be described below with reference to the drawings. In the description of the drawings below, the same or similar parts are denoted by the same or similar reference numerals. However, the drawings are schematic. Therefore, specific dimensions and the like should be determined by referring to the following description. Needless to say, there are parts with different dimensional relationships and ratios between the drawings.

A method for producing a metal solid according to the embodiment includes covering at least a portion of the periphery of a metal powder with a high-melting-point material having a melting point higher than the melting point of the metal powder, and irradiating the metal powder, at least a portion of the periphery of which is covered with the high-melting-point material, with microwaves to heat the metal powder, thereby sintering or melt-solidifying the metal powder. The microwaves are, for example, electromagnetic waves with a frequency of 300 MHz or more and 30 GHz or less. In the portion of the metal powder covered with the high-melting-point material, the metal powder and the high-melting-point material are preferably in close contact with each other.

The material of the metal powder may contain a metal simple substance, or a metal compound such an alloy. Examples of metals include iron (Fe), nickel (Ni), copper (Cu), gold (Au), silver (Ag), aluminum (Al), cobalt (Co), tungsten (W), titanium (Ti), chromium (Cr), molybdenum (Mo), beryllium (Be), magnesium (Mg), tin (Sn), cerium (Ce), lead (Pb), mercury (Hg), sodium (Na), bismuth (Bi), and gallium (Ga). The sintering temperature of iron (Fe) is, for example, 1200° C. The melting point of iron (Fe) is 1538° C. The sintering temperature of nickel (Ni) is, for example, 1200° C. The melting point of nickel (Ni) is 1495° C. The sintering temperature of copper (Cu) is, for example, 800° C. The melting point of copper (Cu) is 1085° C. The sintering temperature of gold (Au) is, for example, 800° C. The melting point of gold (Au) is 1064° C. The sintering temperature of silver (Ag) is, for example, 750° C. The melting point of silver (Ag) is 962° C. The sintering temperature of aluminum (Al) is, for example, 500° C. The melting point of aluminum (Al) is 660° C. The sintering temperature of cobalt (Co) is, for example, 1100° C. The melting point of cobalt (Co) is 1455° C.

The material of the metal powder may contain one type of metal, or may contain a plurality of types of metals. Examples of metal compounds include, but are not particularly limited to, an alloy composed of a plurality of metal elements, an alloy composed of a metal element and a non-metal element, metal oxides, metal hydroxides, metal chlorides, metal carbides, metal borides, and metal sulfides. The metal powder may contain, as alloy components, for example, silicon (Si), manganese (Mn), chromium (Cr), nickel (Ni), carbon (C), boron (B), copper (Cu), aluminum (Al), titanium (Ti), niobium (Nb), vanadium (V), zinc (Zn), antimony (Sb), palladium (Pd), lanthanum (La), gold (Au), potassium (K), cadmium (Cd), indium (In), molybdenum (Mo), and sulfur (S). The material of the metal powder preferably has more excellent microwave absorption characteristics than the surrounding high-melting-point material. Consequently, the metal powder is more easily heated with microwaves than the surrounding high-melting-point material.

The average particle size of the metal powder is, for example, 200 μm or less, 190 μm or less, or 180 μm or less. The average particle size of the metal powder refers to, for example, the median diameter $D_{50}$ in the volume-based cumulative particle size distribution measured by a laser diffraction/scattering method. The particle size distribution of the metal powder is preferably $D_{10}/D_{50}>0.5$ and $D_{50}/D_{90}>0.5$. When the average particle size of the metal powder is 200 μm or less, the metal powder tends to easily absorb microwaves.

The high-melting-point material may contain an insulation material that has higher microwave permeability than the metal powder and that has a lower degree of absorption of microwaves than the metal powder. The insulation material has a melting point higher than the melting point of the metal powder. The insulation material that has a lower degree of absorption of microwaves generates heat at a low degree even when irradiated with microwaves, and exhibits an insulation effect. Further, the insulation material, which has a melting point higher than the metal powder, has a stable shape even when irradiated with microwaves. Therefore, while the metal powder irradiated with microwaves is sintered or melt-solidified, the high-melting-point material containing the insulation material can have a stable shape. The insulation material may be provided as a powder covering the periphery of the metal powder. Alternatively, the insulation material may be provided as a solid. The solid insulation material may have a shape covering the periphery of the metal powder. The solid containing the insulation material may have a plate-like or sheet-like shape.

The insulation material may contain an oxide of a metal or an oxide of a semi-metal. Examples of oxides of metals and semi-metals include, but are not particularly limited to, aluminum oxide ($Al_2O_3$), silicon oxide ($SiO_2$), magnesium oxide (MgO), zirconium oxide ($ZrO_2$), and titanium oxide ($TiO_2$). For example, the melting point of aluminum oxide ($Al_2O_3$) is 2072° C. The melting point of silicon oxide ($SiO_2$) is 1710° C. The melting point of magnesium oxide (MgO) is 2852° C. The insulation material may be a compound of these.

The high-melting-point material may contain an absorbent material that absorbs microwaves in a temperature zone at least a portion of which is lower than a temperature zone in which the metal powder absorbs microwaves. The absorbent material has a melting point higher than the melting point of the metal powder. At least a portion of the temperature zone in which the absorbent material absorbs microwaves is lower than the temperature zone in which the metal powder absorbs microwaves. The temperature zone in which the metal powder absorbs microwaves is, for example, 300° C. or more and 1200° C. or less, 450° C. or more and 1100° C. or less, or 600° C. or more and 800° C. or less. The temperature zone in which the absorbent material absorbs microwaves is, for example, 100° C. or more and 1000° C. or less, 250° C. or more and 900° C. or less, or 400° C. or more and 600° C. or less.

At least a portion of the temperature zone in which the absorbent material absorbs microwaves preferably overlaps with the temperature zone in which the metal powder absorbs microwaves. Since the absorbent material absorbs microwaves in the temperature zone at least a portion of which is lower than the temperature zone in which the metal powder absorbs microwaves, the absorbent material generates heat faster than the metal powder. Accordingly, the absorbent material can heat the metal powder before its temperature reaches the temperature zone in which the metal powder absorbs microwaves. Therefore, when the high-melting-point material contains an absorbent material, the temperature of the metal powder faster reaches the temperature zone in which it absorbs microwaves, and the heating time of the metal powder can be shortened. Moreover, since the absorbent material absorbs microwaves in the temperature zone at least a portion of which is lower than the temperature zone in which the metal powder absorbs microwaves, it is possible to suppress the high-melting-point material from being heated more than necessary. Therefore, while the metal powder irradiated with microwaves is sintered or melt-solidified, the high-melting-point material containing an absorbent material can have a stable shape. The absorbent material may be provided as a powder covering the periphery of the metal powder. Alternatively, the absorbent material may be provided as a solid. The solid absorbent material may have a shape covering the periphery of the metal powder. As described above, when the insulation material is provided as a solid, the absorbent material may be arranged around the metal powder covered with the solid insulation material. When the absorbent material is provided as a solid, the insulation material may be arranged around the metal powder covered with the solid absorbent material. The absorbent material and the insulation material may be both solids.

The absorbent material contains, for example, a carbon material. Examples of the carbon material include, but are not particularly limited to, carbon black, amorphous carbon, graphite, silicon carbide, carbon resin, and metal carbide. The absorbent material may contain a metal powder, metal nitride, metal oxide, metal boride, and the like that absorb microwaves in a temperature zone at least a portion of which is lower than the temperature zone in which the metal powder to be sintered or melt-solidified absorbs microwaves. The absorbent material may be a compound of these. The absorbent material preferably does not contain a volatile component. Because the absorbent material does not contain a volatile component, it is possible to avoid the absorption of microwaves by the volatile component.

The high-melting-point material may contain a reduction material that reduces the metal powder. The reduction material has a melting point higher than the melting point of the metal powder. Examples of the reduction material include carbon and silicon carbide. The carbon material used as an absorbent material can also function as a reduction material.

The high-melting-point material may consist of an insulation material, may consist of an absorbent material, may consist of a reduction material, or may include a combination of these materials. The insulation material, the absorbent material, and the reduction material each may have overlapping properties and functions. For example, the carbon material functions as an absorbent material, and also functions as a reduction material.

When the high-melting-point material contains an insulation material and an absorbent material, it is preferable that the mass ratio of the insulation material and the absorbent material is 1:1, or that the mass ratio of the insulation material is higher than the mass ratio of the absorbent material. For example, the mass ratio of the absorbent material in the high-melting-point material is 1 mass % or more, 2 mass % or more, or 5 mass % or more, and is 70 mass % or less, 50 mass % or less, 40 mass % or less, 30 mass % or less, 20 mass % or less, or 10 mass % or less. By setting the mass ratio of the absorbent material in the high-melting-point material to 70 mass % or less, or 50 mass % or less, it is possible to ensure microwave permeability in the high-melting-point material, and to make the rate of sintering or melt-solidifying the metal powder appropriate.

When the metal powder irradiated with microwaves is a green compact, the high-melting-point material may be a solid powder or the like, and may have flowability. After the metal powder is molded into a green compact with a desired three-dimensional shape, at least a portion of the green compact is covered with a high-melting-point material, the green compact covered with the high-melting-point material is then irradiated with microwaves to sinter the green compact, and by metallurgy, a metal solid of a desired shape is produced. Alternatively, the green compact covered with the high-melting-point material is irradiated with microwaves, and then cooled to melt-solidify the green compact, and a metal solid of a desired shape is produced. The entire periphery of the green compact may be covered with the high-melting-point material. The thickness, volume, etc. of the high-melting-point material covering the green compact can be appropriately set based on microwave permeability.

When the metal powder is molded into a green compact, a pressure of, for example, 1 MPa or more, 100 MPa or more, or 200 MPa or more, and 2000 MPa or less, 1900 MPa or less, or 1800 MPa or less, may be applied to the metal powder. By pressurization, the metal solid to be produced tends to be dense. Examples of the pressurization method include uniaxial molding, cold isostatic pressing (CIP) molding, hot isostatic pressing (HIP) molding, roller pressurization, and the like.

When the metal powder irradiated with microwaves has flowability, the high-melting-point material may be in the form of a solid, such as a mold or container. For example, the entire metal powder irradiated with microwaves may be a powder, or a portion of the metal powder may be a green compact. The metal powder is placed in the recess of a mold or container made of the high-melting-point material and corresponding to a desired three-dimensional shape, at least a portion of the metal powder is covered with the mold or container made of the high-melting-point material, and the metal powder covered with the mold or container made of the high-melting-point material is then irradiated with microwaves, thereby sintering the metal powder, and a metal solid of a desired shape is produced. Alternatively, the metal powder covered with the high-melting-point material is irradiated with microwaves, and then cooled, thereby melt-solidifying the green compact, and a metal solid of a desired shape is produced. The entire periphery of the metal powder may be covered with the mold or container made of the high-melting-point material. The thickness, volume, etc. of the mold or container made of the high-melting-point material covering the green compact can be appropriately set based on microwave permeability. The composition of the metal powder to be placed in the mold or container made of the high-melting-point material may be changed depending on the position. For example, the type of metal forming the metal powder and the alloy component of the metal powder may be changed depending on the position.

After the metal powder is placed in the mold or container made of the high-melting-point material, and before the meatal powder is irradiated with microwaves, a pressure of, for example, 1 MPa or more, 100 MPa or more, or 200 MPa or more, and 2000 MPa or less, 1900 MPa or less, or 1800 MPa or less, may be applied to the metal powder. By pressurization, the metal solid to be produced tends to be dense. Examples of the pressurization method include uniaxial molding, cold isostatic pressing (CIP) molding, hot isostatic pressing (HIP) molding, roller pressurization, and the like.

When the high-melting-point material is formed into a solid, such as a mold or container, a curable material, such as a photocurable resin, may be dispersed in the high-melting-point material, and the mixture of the high-melting-point material and the photocurable resin may be irradiated with light to cure the mixture of the high-melting-point material and the photocurable resin. When the photocurable resin is a ultraviolet ray-curable resin, the mixture of the high-melting-point material and the photocurable resin is irradiated with ultraviolet rays. The light irradiation time is, for example, 1 hour or more, 2 hours or more, or 3 hours or more. The mass ratio of the photocurable resin in the mixture of the high-melting-point material and the photocurable resin is, for example, 1% or more, 2% or more, or 3% or more, and is 10% or less, 9% or less, or 8% or less. By setting the mass ratio of the photocurable resin in the mixture of the high-melting-point material and the photocurable resin to 1% or more and 10% or less, it is possible to ensure hardness and microwave permeability. The curable material may be thermosetting. In this case, the mixture of the high-melting-point material and the thermosetting material may be heated to cure the mixture of the high-melting-point material and the thermosetting material.

When the metal powder irradiated with microwaves and the high-melting-point material are both powders, the metal powder and the high-melting-point material may be laminated, and the laminated metal powder and high-melting-point material may be then irradiated with microwaves. After the metal powder and the high-melting-point material are laminated, and before they are irradiated with microwaves, for example, a pressure of 1 MPa or more, 100 Mpa or more, or 200 Mpa or more, and 2000 Mpa or less, 1900 Mpa or less, or 1800 Mpa or less, may be applied to the laminated metal powder and high-melting-point material. By pressurization, the metal solid to be produced tends to be dense. Examples of the pressurization method include uniaxial molding, cold isostatic pressing (CIP) molding, hot isostatic pressing (HIP) molding, roller pressurization, and the like.

After the metal powder is sintered or melt-solidified, a pressure may be applied to the formed metal solid. In this case, a pressure is preferably applied while the metal solid has heat before being cooled to the atmospheric temperature, and while the temperature is higher than the atmospheric temperature. The pressure to be applied is, for example, 1 MPa or more, 100 MPa or more, or 200 MPa or more, and is 2000 MPa or less, 1900 MPa or less, or 1800 MPa or less. By pressurization, the metal solid to be produced tends to be dense. Examples of the pressurization method include uniaxial molding, cold isostatic pressing (CIP) molding, hot isostatic pressing (HIP) molding, roller pressurization, and the like.

When the metal powder contains a metal oxide, the metal powder covered with the high-melting-point material containing a reduction material is irradiated with microwaves to thereby reduce the metal oxide. When the metal powder is heated to a temperature equal to or higher than the sintering temperature and around the melting point, a dense sintered body is likely to be obtained. Therefore, the metal powder may be heated with microwaves to 1400° C. or more, or 1500° C. or more. When the metal powder is melt-solidified, the metal powder may be heated to a temperature equal to or higher than the melting point. Before the metal powder is irradiated with microwaves, an oxide powder of the metal may be reduced in advance. For example, a metal oxide powder can be reduced by mixing the metal oxide powder with a carbon powder, and heating the mixture of the metal oxide powder and the carbon powder. The reduced metal powder can be separated from the carbon powder by using, for example, a magnet.

The metal powder may be heated in an inert gas atmosphere. Examples of the inert gas include argon (Ar) and helium (He). The metal powder may also be heated in a neutral gas atmosphere. Examples of the neutral gas include nitrogen ($N_2$), dry hydrogen ($H_2$), and ammonia ($NH_3$). The metal powder may also be heated in a reducing atmosphere. Examples of the reducing gas that provides a reducing atmosphere include hydrogen ($H_2$), carbon monoxide (CO), and hydrocarbon gases ($CH_4$, $C_3H_8$, $C_4H_{10}$, etc.). When the high-melting-point material is in the form of a mold or container, an inert gas, a neutral gas, or a reducing gas may be supplied into the mold or container made of the high-melting-point material.

The covering at least a portion of the periphery of a metal powder with a high-melting-point material, and the sintering or melt-solidifying the metal powder may be repeated to form laminated metal solids. The metal solids obtained by the above method may also be polished. Alternatively, a metal solid obtained by the above method is used, for example, as a core, a metal powder is arranged around the core, and a high-melting-point material is further arranged around the metal powder, followed by irradiation with microwaves; this operation may be repeated. As a result, it is possible to scale up the metal solids. In addition, every time microwaves are applied, the compositions of the metal powder and the high-melting-point material may be each changed. For example, every time microwaves are applied, the alloy component of the metal powder may be changed.

A device for producing a metal solid according to the embodiment includes, as shown in FIG. 1, a stage 10 on which a metal powder and a high-melting-point material covering at least a portion of the periphery of the metal powder and having a melting point higher than the melting point of the metal powder are placed, and a microwave irradiator 20 for irradiating the metal powder, at least a portion of the periphery of which is covered with the high-melting-point material, with microwaves to heat the metal powder, thereby sintering or melt-solidifying the metal powder. The device for producing a metal solid according to the embodiment can perform, for example, the method for producing a metal solid according to the embodiment described above.

The stage 10 is not particularly limited as long as the metal powder and the high-melting-point material can be placed thereon. The stage 10 may be movable in three mutually perpendicular directions. For example, the stage 10 may be movable in the gravity direction and horizontal direction.

Figure 2:
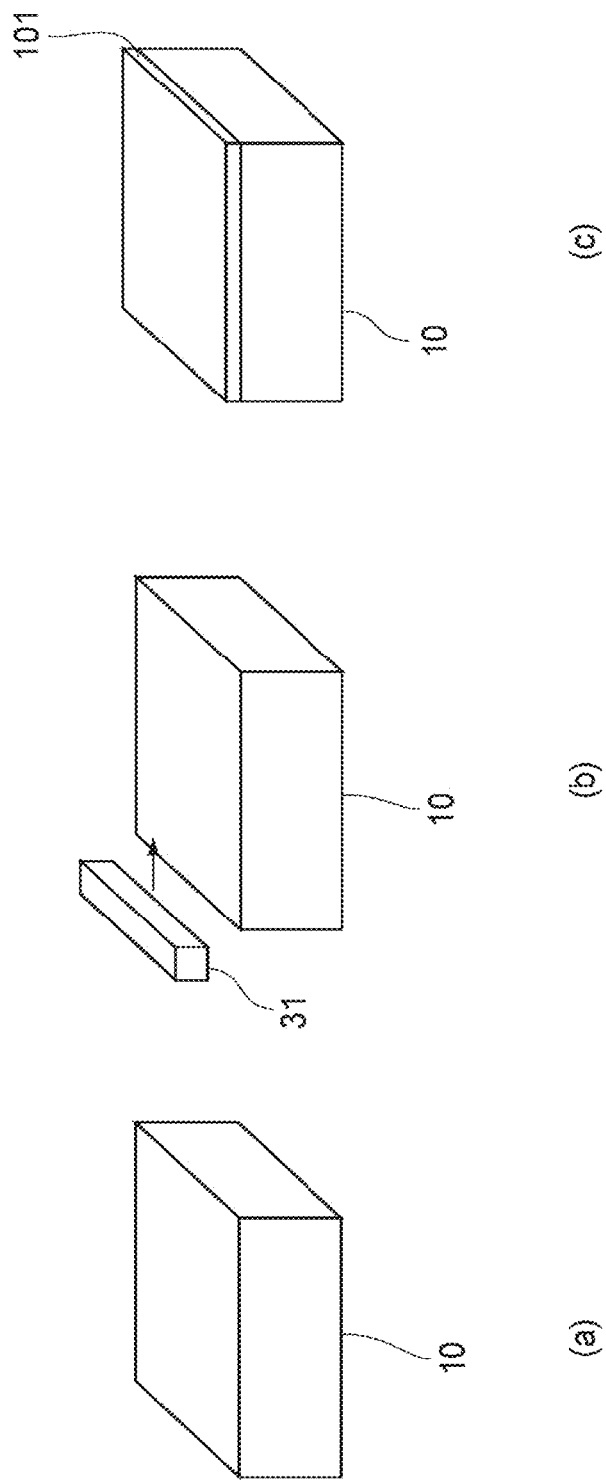
FIG. 2 is a schematic process diagram of a method for producing a metal solid according to an embodiment.

The device for producing a metal solid according to the embodiment may further include a high-melting-point material placement unit 31 that places a high-melting-point material on the stage 10. The high-melting-point material placement unit 31 may apply the high-melting-point material onto the stage 10. The high-melting-point material placement unit 31 may form a layer of the high-melting-point material on the stage 10. The high-melting-point material placement unit 31 may be movable in three mutually perpendicular directions. For example, the high-melting-point material placement unit 31 may be movable in the gravity direction and horizontal direction. For example, as shown in FIGS. 2 (*a*) to 2 (*c*), the high-melting-point material placement unit 31 may apply powder of the high-melting-point material onto the stage 10 while moving on the stage 10 to form a layer 101 of the high-melting-point material on the stage 10.

Figure 3:
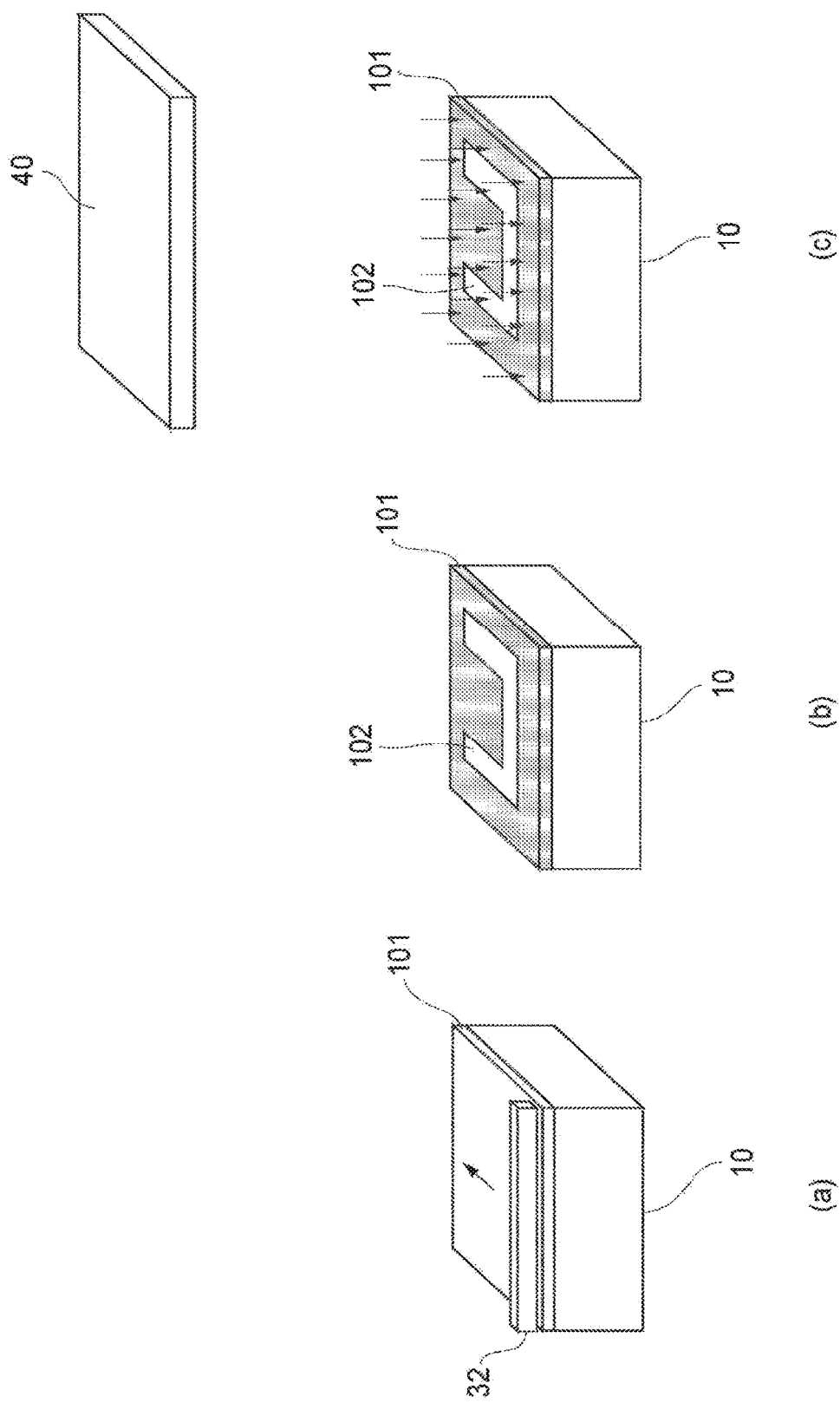
FIG. 3 is a schematic process diagram of a method for producing a metal solid according to an embodiment.

As shown in FIG. 1, the device for producing a metal solid according to the embodiment may further include a curable material addition unit 32 that adds a curable material to at least a portion of the high-melting-point material. The curable material addition unit 32 adds the curable material to a portion of the high-melting-point material to be cured, and does not add the curable material to a portion of the high-melting-point material not to be cured. The curable material is, for example, a liquid, and the curable material addition unit 32 may impregnate the portion of the high-melting-point material to be cured with the curable material. The curable material addition unit 32 may be movable in three mutually perpendicular directions. For example, the curable material addition unit 32 may be movable in the gravity direction and horizontal direction. For example, as shown in FIGS. 3 (*a*) and 3 (*b*), the curable material addition unit 32 may apply a curable material while patterning to the layer 101 of the high-melting-point material while moving on the layer 101 of the high-melting-point material on the stage 10, may not add the curable material to a portion 102 not to be cured in the layer 101 of the high-melting-point material, and may add the curable material to a portion to be cured in the layer 101 of the high-melting-point material. The curable material addition unit 32 may include, for example, an inkjet nozzle, and may add the curable material to the high-melting-point material by the binder jetting technique.

The high-melting-point material placement unit 31 and the curable material addition unit 32 may be integrated with each other.

As shown in FIG. 1, the device for producing a metal solid according to the embodiment may further include a curing device 40 that cures at least a portion of the high-melting-point material. When the high-melting-point material contains a photocurable material, the curing device 40 is a light source. When the high-melting-point material contains a thermosetting material, the curing device 40 is a heat source. The curing device 40 may be movable in three mutually perpendicular directions. For example, the curing device 40 may be movable in the gravity direction and horizontal direction. As shown in FIG. 3 (*c*), the curing device 40 applies energy necessary to cure the curable material to the layer 101 of the high-melting-point material to cure at least a portion of the layer 101 of the high-melting-point material. The curing device 40 may apply energy to the entire surface of the layer 101 of the high-melting-point material, or may apply energy while scanning the layer 101 of the high-melting-point material.

Figure 4:
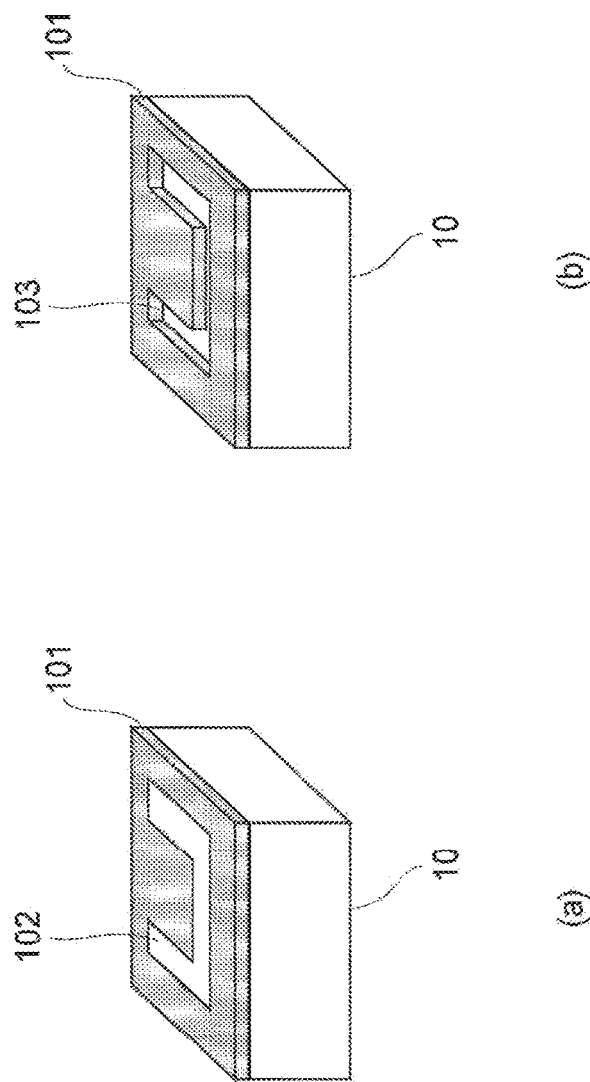
FIG. 4 is a schematic process diagram of a method for producing a metal solid according to an embodiment.

As shown in FIG. 1, the device for producing a metal solid according to the embodiment may further include an uncured material remover 50 that removes the uncured high-melting-point material. For example, as shown in FIGS. 4 (*a*) and 4 (*b*), the uncured material remover 50 may apply wind pressure to the uncured powder portion 102 of the layer 101 of the high-melting-point material to remove the uncured powder portion 102 from the layer 101 of the high-melting-point material, and may form a recess 103 in the layer 101 of the high-melting-point material.

Figure 5:
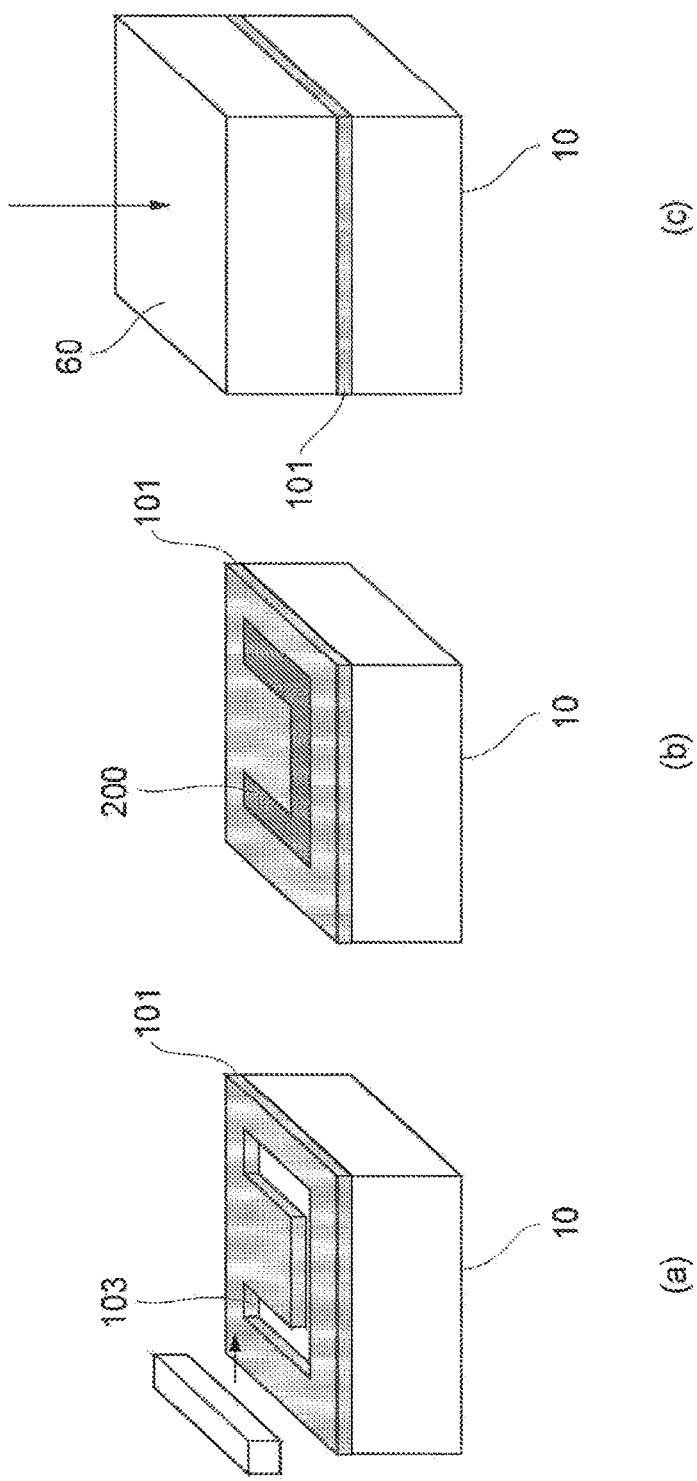
FIG. 5 is a schematic process diagram of a method for producing a metal solid according to an embodiment.

As shown in FIG. 1, the device for producing a metal solid according to the embodiment may further include a metal powder placement unit 33 that places the metal powder on the stage 10. A recoater can be used as the metal powder placement unit 33. The metal powder placement unit 33 may apply the metal powder onto the stage 10. The metal powder placement unit 33 may be movable in three mutually perpendicular directions. For example, the metal powder placement unit 33 may be movable in the gravity direction and horizontal direction. For example, as shown in FIGS. 5 (*a*) and 5 (*b*), the metal powder placement unit 33 may place the metal powder 200 in the recess 103 of the layer 101 of the high-melting-point material on the stage 10. The metal powder placed on the surface of a portion of the layer 101 of the high-melting-point material on the stage 10 in which the recess 103 is not formed may be removed with a roller, a brush, or the like.

The high-melting-point material placement unit 31 and the metal powder placement unit 33 may be integrated with each other. The curable material addition unit 32 and the metal powder placement unit 33 may be integrated with each other. The high-melting-point material placement unit 31, the curable material addition unit 32, and the metal powder placement unit 33 may be integrated with each other.

As shown in FIG. 1, the device for producing a metal solid according to the embodiment may further include a pressurizer 60 that applies a pressure to the metal powder placed on the stage 10. As shown in FIG. 5 (*c*), the pressurizer 60 applies a pressure to the metal powder 200 before irradiation with microwaves. Examples of the pressurization method include uniaxial molding, cold isostatic pressing (CIP) molding, hot isostatic pressing (HIP) molding, roller pressurization, and the like. In the case of roller pressurization, the pressurization tip of the pressurizer 60 may be a roller type, and a pressurization technique that slides the stage 10 while the roller is pressurized on the stage 10 may be selected.

For example, as shown in FIG. 6, the microwave irradiator 20 applies microwaves to the metal powder 200 placed in the recess 103 of the layer 101 of the high-melting-point material on the stage 10. The microwave irradiator 20 may apply microwaves to the entire surface of the metal powder 200 all at once, or may apply microwaves while scanning the metal powder 200. The device for producing a metal solid according to the embodiment may further include an inert gas supplier that supplies an inert gas to the metal powder. The inert gas supplier supplies an inert gas around the metal powder 200 at least while the metal powder 200 is irradiated with microwaves. The device for producing a metal solid according to the embodiment may further include a reducing gas supplier that supplies a reducing gas to the metal powder. The reducing gas supplier supplies a reducing gas around the metal powder 200 at least while the metal powder 200 is irradiated with microwaves. The device for producing a metal solid according to the embodiment may further include a neutral gas supplier that supplies a reducing gas to the metal powder. The neutral gas supplier supplies a neutral gas around the metal powder 200 at least while the metal powder 200 is irradiated with microwaves. The inert gas supplier and the reducing gas supplier may be integrated with each other. The inert gas supplier and the neutral gas supplier may be integrated with each other. The reducing gas supplier and the neutral gas supplier may be integrated with each other.

As shown in FIG. 1, the device for producing a metal solid according to the embodiment may include a thermometer 71 that measures the temperature of the metal powder placed on the stage 10. A radiation thermometer can be used as the thermometer 71. The radiation thermometer measures the temperature of the metal powder based on the emissivity of the material of the metal powder. The thermometer 71 may also measure the temperature of the high-melting-point material. The microwaves emitted by the microwave irradiator 20 may be controlled based on the temperature of the metal powder measured by the thermometer 71. The device for producing a metal solid according to the embodiment may also include a microwave detector 72 that detects the microwaves emitted by the microwave irradiator 20. The microwaves emitted by the microwave irradiator 20 may be controlled based on the characteristics of the microwaves detected by the microwave detector 72.

The pressurizer 60 shown in FIG. 1 may apply a pressure to the metal powder 200 after the metal powder 200 is irradiated with microwaves. Examples of the pressurization method include uniaxial molding, cold isostatic pressing (CIP) molding, hot isostatic pressing (HIP) molding, roller pressurization, and the like. In the case of roller pressurization, the pressurization tip of the pressurizer 60 may be a roller type, and a pressurization technique that slides the stage 10 while the roller is pressurized on the stage 10 may be selected.

The metal powder 200 placed in the recess 103 of the layer 101 of the high-melting-point material on the stage 10 shown in FIG. 6 and irradiated with microwaves is then cooled, and sintered or melt-solidified to become a metal solid. The metal powder 200 in the vicinity of the edge part of the recess 103 of the layer 101 of the high-melting-point material tends to be easily heated. Therefore, in the vicinity of the edge part of the recess 103, the mass ratio of the absorbent material contained in the high-melting-point material may be lower than other parts.

The stage 10, microwave irradiator 20, etc. of the device for producing a metal solid according to the embodiment may be stored in a housing.

The device for producing a metal solid according to the embodiment may repeat forming the layer 101 of the high-melting-point material surrounding the metal powder on the sintered or melt-solidified metal solid and the layer 101 of the high-melting-point material surrounding the metal solid, and sintering or melt-solidifying the metal powder. As a result, even if the thickness of a metal solid formed by single microwave irradiation is thin, metal solids are laminated, and it is possible to produce thick metal solids. Every time the layer 101 of the high-melting-point material surrounding the metal powder is formed, the shape of the recess formed in the layer 101 of the high-melting-point material is changed, whereby it is possible to produce metal solids having a complex three-dimensional shape.

Figure 7:
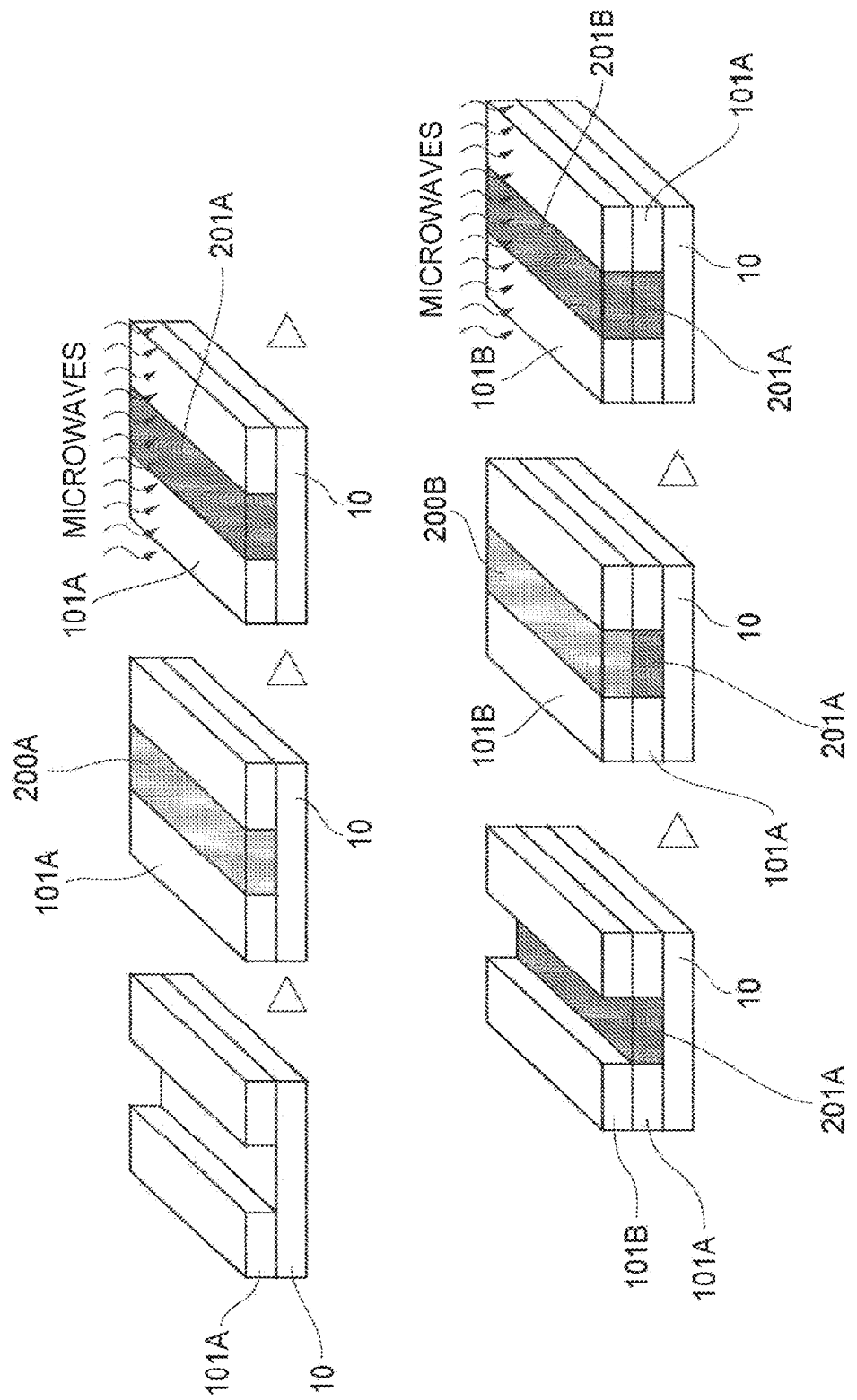
FIG. 7 is a schematic process diagram of a method for producing a metal solid according to an embodiment.

That is, as shown in FIG. 7, a first layer 101A of the high-melting-point material is formed on the stage 10, and a metal powder 200A is placed in the recess of the layer 101A of the high-melting-point material. Next, the metal powder 200A is irradiated with microwaves to convert the metal powder 200A into a first layer of a metal solid 201A. Next, a second layer 101B of the high-melting-point material is formed on the first layer 101A of the high-melting-point material, and a metal powder 200B is placed in the recess of the layer 101B of the high-melting-point material. Here, the first layer of the metal solid 201A is exposed from the recess of the layer 101B of the high-melting-point material, and the metal powder 200B is in contact with the surface of the first layer of the metal solid 201A. Next, the metal powder 200B is irradiated with microwaves to convert the metal powder 200B into a second layer of a metal solid 201B. At this time, the second layer of the metal solid 201B sticks to the first layer of the metal solid 201A. Thereafter, the same process is repeated to laminate metal solids.

Figure 8:
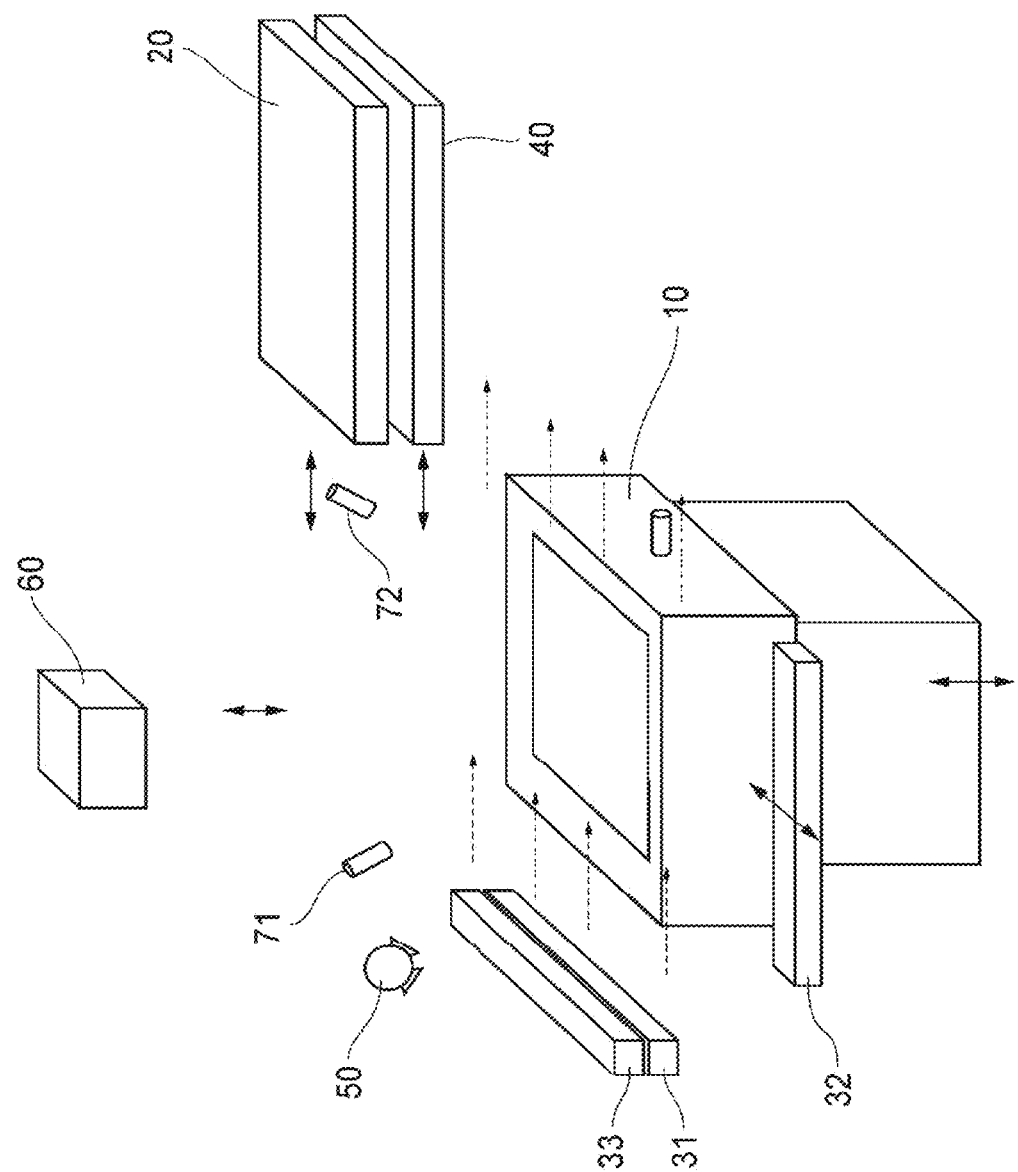
FIG. 8 is a schematic perspective view of a device for producing a metal solid according to an embodiment.
Figure 9:
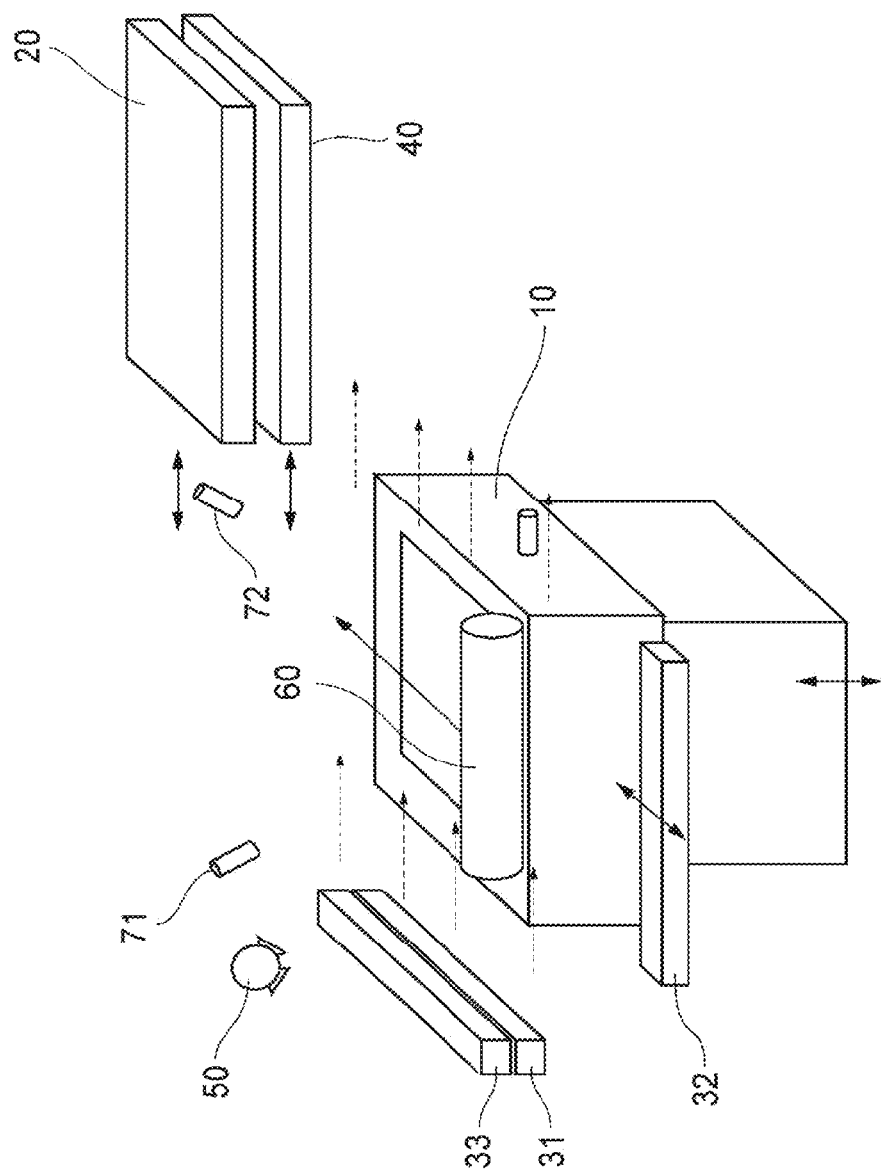
FIG. 9 is a schematic perspective view of a device for producing a metal solid according to an embodiment.
Figure 10:
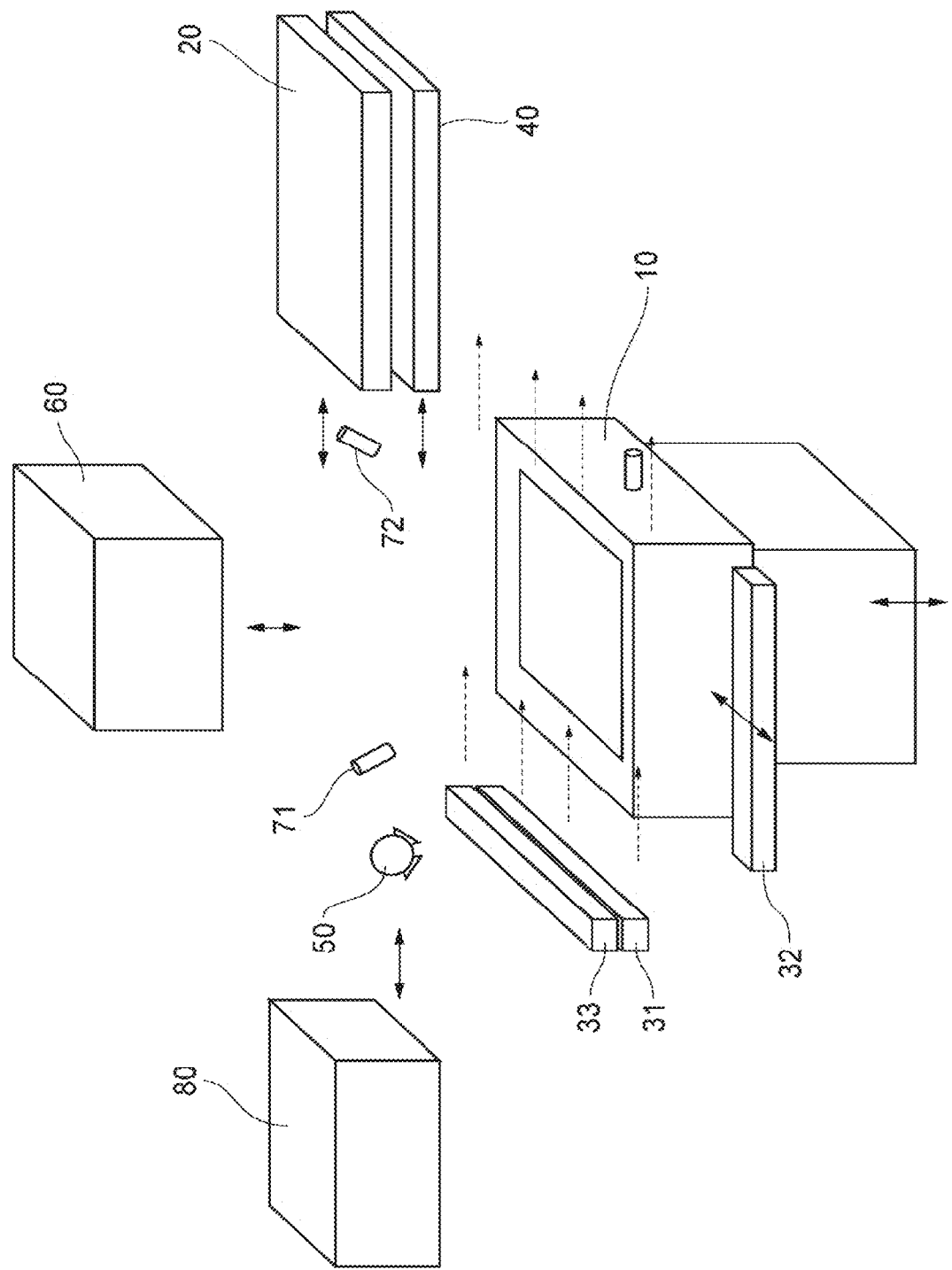
FIG. 10 is a schematic perspective view of a device for producing a metal solid according to an embodiment.

The present disclosure has been described based on the embodiments as described above; however, the description and drawings forming part of this disclosure should not be understood as limiting the invention. Various alternative embodiments, examples, and operational techniques should become apparent to those skilled in the art from this disclosure. For example, the pressurizer 60 shown in FIG. 1 may pressurize the entire surface of the placed metal powder 200. Alternatively, as shown in FIG. 8, the pressurizer 60 having a contact area smaller than the surface area of the placed metal powder 200 may continuously pressurize the metal powder 200 while moving. Examples of the pressurization method include uniaxial molding, cold isostatic pressing (CIP) molding, hot isostatic pressing (HIP) molding, roller pressurization, and the like. In the case of roller pressurization, as shown in FIG. 9, the pressurizer 60 may include a roller, and a pressurization technique that moves the roller on the stage 10 or that slides the stage 10, while the roller is pressurized on the stage 10 may be selected. Further, for example, as shown in FIG. 10, the device for producing a metal solid according to the embodiment may include a reduction device 80 that reduces the metal powder before the metal powder is irradiated with microwaves. The reduction device 80 is, for example, a heating device, and heats the metal powder to reduce the metal powder. Thus, it should be understood that the present invention encompasses various embodiments and the like that are not described herein.

EXAMPLES

Example 1

A layer of a high-melting-point material was formed. The high-melting-point material was made of 93 mass % of aluminum oxide ($Al_2O_3$) powder and 7 mass % of carbon (C) powder. A portion of the surface of the layer of the high-melting-point material to be provided with a recess was covered with a circular aluminum plate, and a curable material was sprayed to the surface of the layer of the high-melting-point material so that a portion of the layer of the high-melting-point material not covered with the aluminum plate was impregnated with the curable material. The curable material contained 50 mass % of UV-curable resin (Standard Photopolymer Resin, produced by AMZLAB GmbH) and 50 mass % of ethanol. Thereafter, the layer of the high-melting-point material was irradiated with UV light to cure the curable resin impregnated into the layer of the high-melting-point material. The uncured high-melting-point material covered with the aluminum plate was removed with air shower. As a result, a cylindrical recess was formed in the layer of the high-melting-point material. The bottom diameter of the cylindrical recess was 7.0 mm, and the depth was 4.0 mm.

Figure 11:
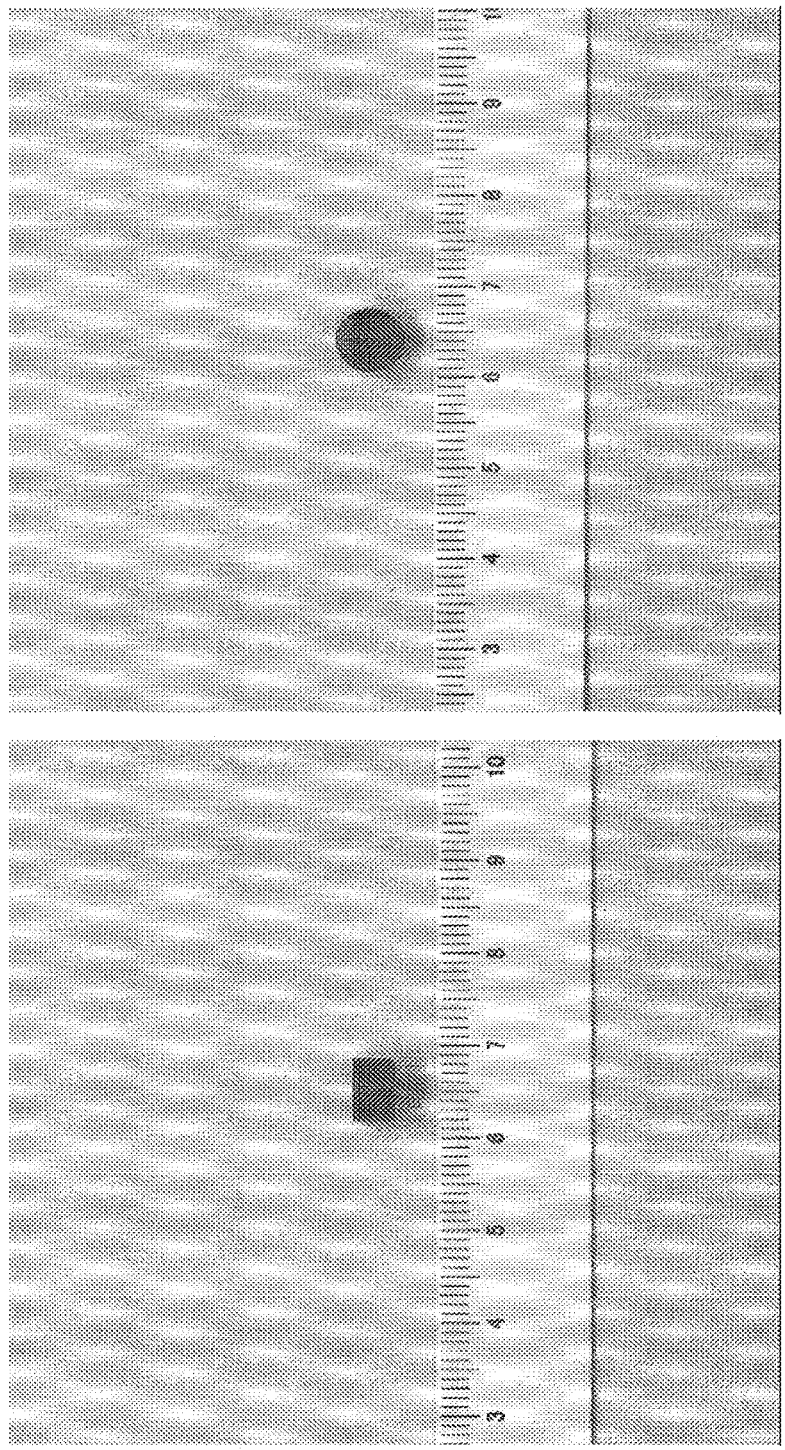
FIG. 11 shows photographs of a metal solid obtained in Example 1.

The recess provided in the layer of the high-melting-point material was filled with a metal powder (average particle size: 45 μm). The metal powder was made of 100% of iron (Fe). A press machine was used to apply a pressure of 250 MPa to the metal powder and the high-melting-point material surrounding the metal powder. The high-melting-point material and the metal powder were irradiated with 700 W of microwaves for 180 seconds under air atmosphere, and the metal powder was heated to 1350° C. (estimate). FIG. 11 shows photographs of a metal solid obtained by sintering the metal powder. The obtained metal solid was cylindrical, the bottom diameter was 7.0 mm, and the height was 4.0 mm. The density of the obtained metal solid was 4.5 g/cm$^2$, and the relative density (=density/true density) was 58%.

Example 2

A first layer of a high-melting-point material was formed. The high-melting-point material was made of 93 mass % of aluminum oxide ($Al_2O_3$) powder and 7 mass % of carbon (C) powder. A portion of the surface of the first layer of the high-melting-point material to be provided with a recess was covered with a circular aluminum plate, and a curable material was sprayed to the surface of the first layer of the high-melting-point material so that a portion of the first layer of the high-melting-point material not covered with the aluminum plate was impregnated with the curable material. The curable material contained 50 mass % of UV-curable resin (Standard Photopolymer Resin, produced by AMZLAB GmbH) and 50 mass % of ethanol. Thereafter, the first layer of the high-melting-point material was irradiated with UV light to cure the curable resin impregnated into the first layer of the high-melting-point material. The uncured high-melting-point material covered with the aluminum plate was removed with air shower. As a result, a cylindrical recess was formed in the first layer of the high-melting-point material. The bottom diameter of the cylindrical recess was 7.0 mm, and the depth was 4.2 mm.

The recess provided in the first layer of the high-melting-point material was filled with a metal powder. The metal powder was made of 100% of iron (Fe). A press machine was used to apply a pressure of 250 MPa to the metal powder and the high-melting-point material surrounding the metal powder. The high-melting-point material and the metal powder were irradiated with 700 W of microwaves for 180 seconds under air atmosphere to heat the metal powder to 1350° C. (estimate), thereby obtaining a cylindrical metal solid.

A second layer of a high-melting-point material was formed on the first layer of the high-melting-point material. The high-melting-point material was made of 93 mass % of aluminum oxide ($Al_2O_3$) and 7 mass % of carbon (C). A portion of the surface of the second layer of the high-melting-point material to be provided with a recess, right above the metal solid surrounded by the first layer of the high-melting-point material was covered with a circular aluminum plate, and a curable material was sprayed to the surface of the second layer of the high-melting-point material so that a portion of the second layer of the high-melting-point material not covered with the aluminum plate was impregnated with the curable material. The curable material contained 50 mass % of UV-curable resin (Standard Photopolymer Resin, produced by AMZLAB GmbH) and 50 mass % of ethanol. Thereafter, the second layer of the high-melting-point material was irradiated with UV light to cure the curable resin impregnated into the second layer of the high-melting-point material. The uncured high-melting-point material covered with the aluminum plate was removed with air shower. As a result, a cylindrical recess was formed in the second layer of the high-melting-point material. The bottom diameter of the cylindrical recess was 7.0 mm, and the depth was 2.4 mm. The upper surface of the metal solid surrounded by the first layer of the high-melting-point material was exposed from the recess provided in the second layer of the high-melting-point material.

The recess provided in the second layer of the high-melting-point material was filled with a metal powder. The metal powder was made of 100% of iron (Fe). A press machine was used to apply a pressure of 250 MPa to the metal powder and the high-melting-point material surrounding the metal powder. The high-melting-point material and the metal powder were irradiated with 700 W of microwaves for 180 seconds under air atmosphere to heat the metal powder to 1350° C. (estimate), thereby obtaining a cylindrical metal solid. In this case, the metal solid surrounded by the first layer of the high-melting-point material and the metal solid surrounded by the second layer of the high-melting-point material were combined together.

Figure 12:
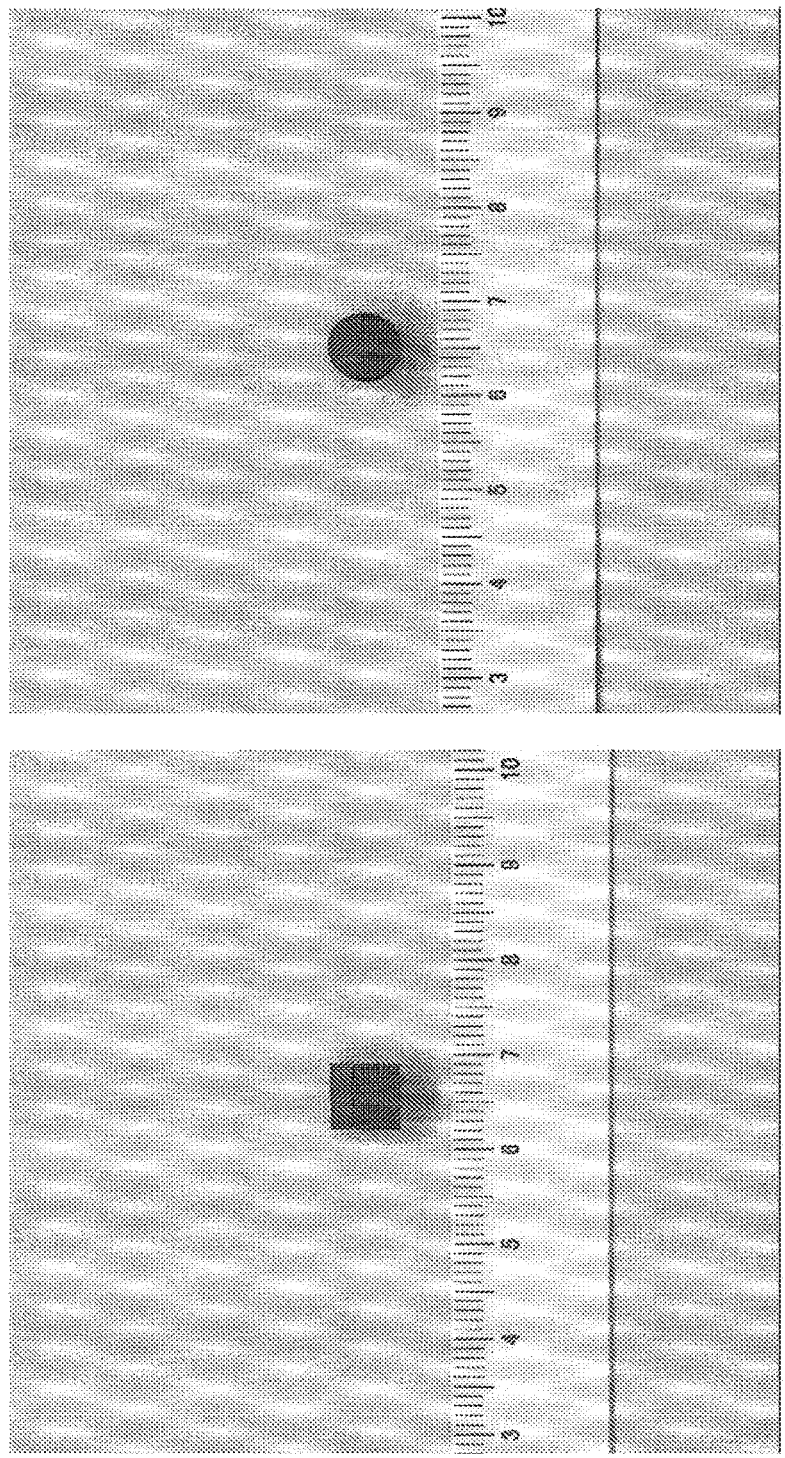
FIG. 12 shows photographs of a metal solid obtained in Example 2.

FIG. 12 shows photographs of a metal solid obtained by sintering the metal powder. The obtained metal solid was cylindrical, the bottom diameter was 7.0 mm, and the height was 6.6 mm. The density of the obtained metal solid was 4.1 g/cm$^2$, and the relative density was 52%.

Example 3

A layer of a high-melting-point material was formed. The high-melting-point material was made of 93 mass % of aluminum oxide ($Al_2O_3$) powder and 7 mass % of carbon (C) powder. A portion of the surface of the layer of the high-melting-point material to be provided with a recess was covered with a triangular aluminum plate, and a curable material was sprayed to the surface of the layer of the high-melting-point material so that a portion of the layer of the high-melting-point material not covered with the aluminum plate was impregnated with the curable material. The curable material contained 50 mass % of UV-curable resin (Standard Photopolymer Resin, produced by AMZLAB GmbH) and 50 mass % of ethanol. Thereafter, the layer of the high-melting-point material was irradiated with UV light to cure the curable resin impregnated into the layer of the high-melting-point material. The uncured high-melting-point material covered with the aluminum plate was removed with air shower. As a result, a triangular prismatic recess was formed in the layer of the high-melting-point material. The length of the base of the bottom of the triangular prismatic recess was 8.0 mm, and the depth was 1.4 mm.

Figure 13:
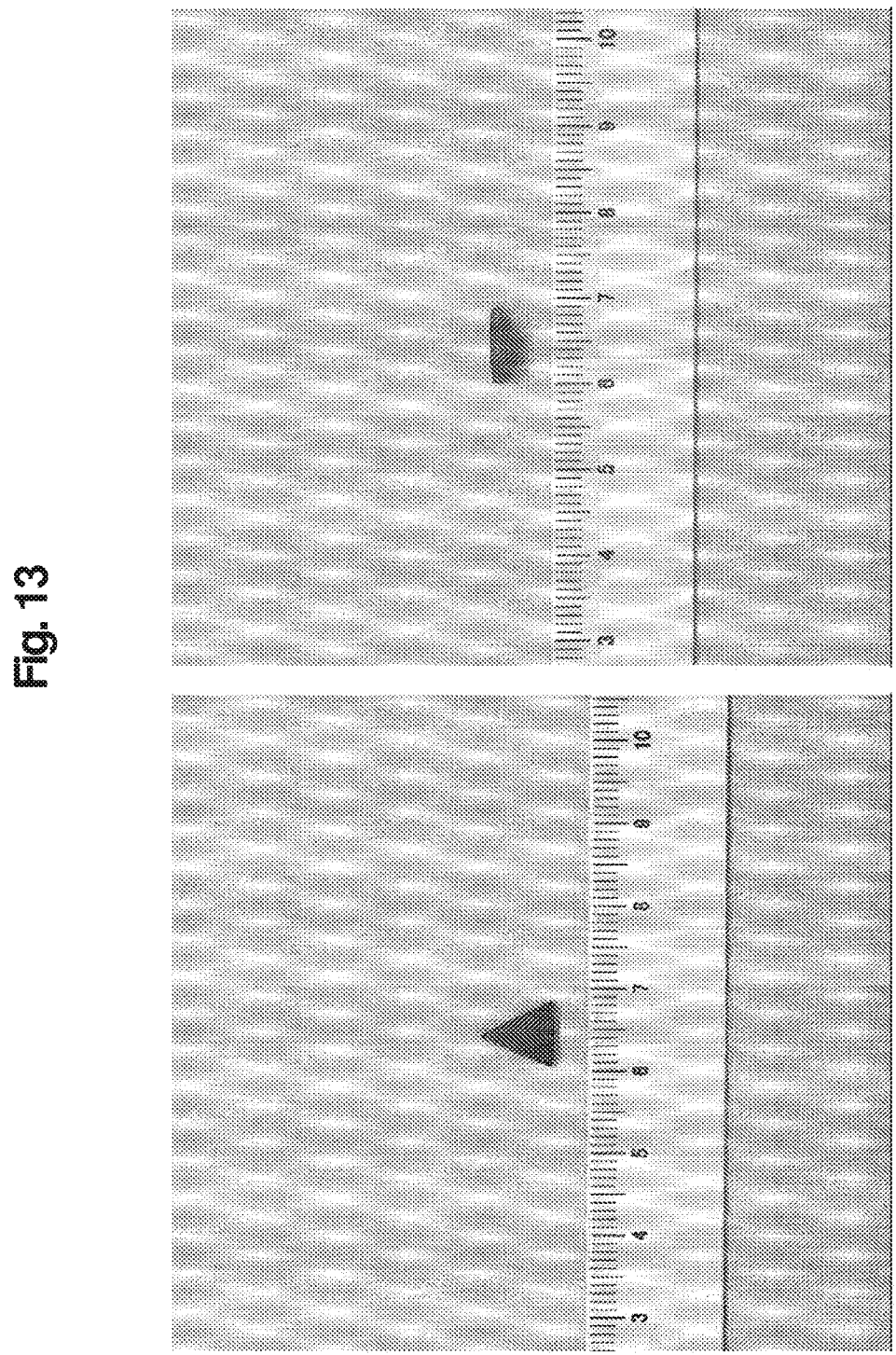
FIG. 13 shows photographs of a metal solid obtained in Example 3.

The recess provided in the layer of the high-melting-point material was filled with a metal powder. The metal powder was made of 100% of iron (Fe). A press machine was used to apply a pressure of 250 MPa to the metal powder and the high-melting-point material surrounding the metal powder. The high-melting-point material and the metal powder were irradiated with 500 W of microwaves for 70 seconds under air atmosphere to heat the metal powder to 1250° C. (estimate). FIG. 13 shows photographs of a metal solid obtained by sintering the metal powder. The obtained metal solid was triangular prismatic, the length of the base of the bottom was 8.0 mm, and the height was 1.4 mm. The density of the obtained metal solid was 4.5 g/cm$^2$, and the relative density was 58%.

Example 4

A layer of a high-melting-point material was formed. The high-melting-point material was made of 93 mass % of aluminum oxide ($Al_2O_3$) powder and 7 mass % of carbon (C) powder. A portion of the surface of the layer of the high-melting-point material to be provided with a recess was covered with a square aluminum plate, and a curable material was sprayed to the surface of the layer of the high-melting-point material so that a portion of the layer of the high-melting-point material not covered with the aluminum plate was impregnated with the curable material. The curable material contained 50 mass % of UV-curable resin (Standard Photopolymer Resin, produced by AMZLAB GmbH) and 50 mass % of ethanol. Thereafter, the layer of the high-melting-point material was irradiated with UV light to cure the curable resin impregnated into the layer of the high-melting-point material. The uncured high-melting-point material covered with the aluminum plate was removed with air shower. As a result, a quadrangular prismatic recess was formed in the layer of the high-melting-point material. The length of the base of the bottom of the quadrangular prismatic recess was 7.2 mm, and the depth was 1.9 mm.

Figure 14:
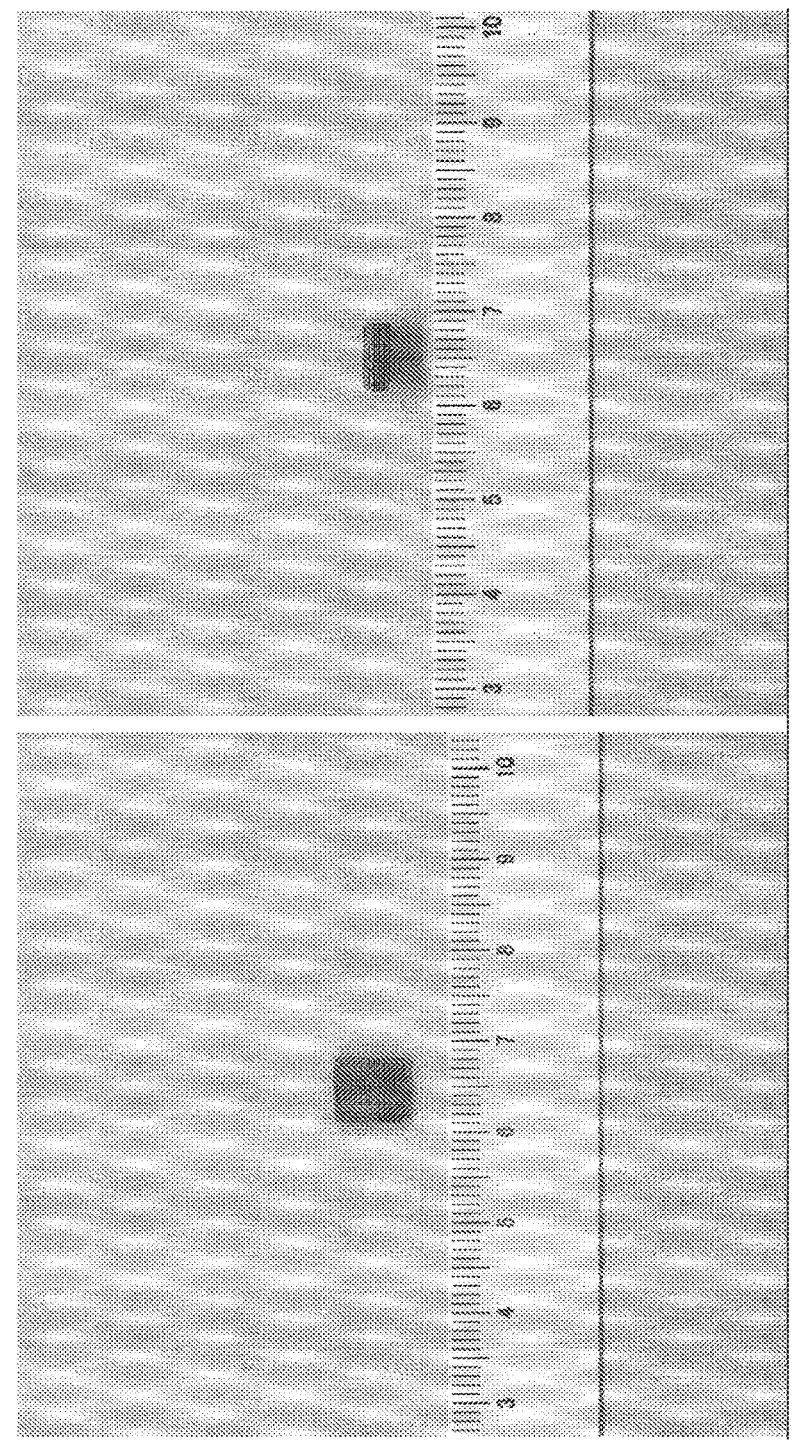
FIG. 14 shows photographs of a metal solid obtained in Example 4.

The recess provided in the layer of the high-melting-point material was filled with a metal powder. The metal powder was made of 100% of iron (Fe). A press machine was used to apply a pressure of 250 MPa to the metal powder and the high-melting-point material surrounding the metal powder. The high-melting-point material and the metal powder were irradiated with 500 W of microwaves for 70 seconds under air atmosphere to heat the metal powder to 1250° C. (estimate). FIG. 14 shows photographs of a metal solid obtained by sintering the metal powder. The obtained metal solid was quadrangular prismatic, the length of the base of the bottom was 7.2 mm, and the height was 1.9 mm. The density of the obtained metal solid was 4.5 g/cm$^2$, and the relative density was 58%.

Example 5

A metal powder (SUS316L, particle size: 100 μm or less) was prepared. PolyCast (registered trademark, Polymaker) was prepared as a material for a resin mold. The material of PolyCast is polyvinyl butyral (>80%), the melting point is from 135° C. to 210° C., the decomposition point is >280° C., and the ignition point is 380° C. Using PolyCast, a resin mold with an outer diameter ϕ of 10 shown in FIG. 15 was molded by a 3D printer (Polymaker).

Figure 15:
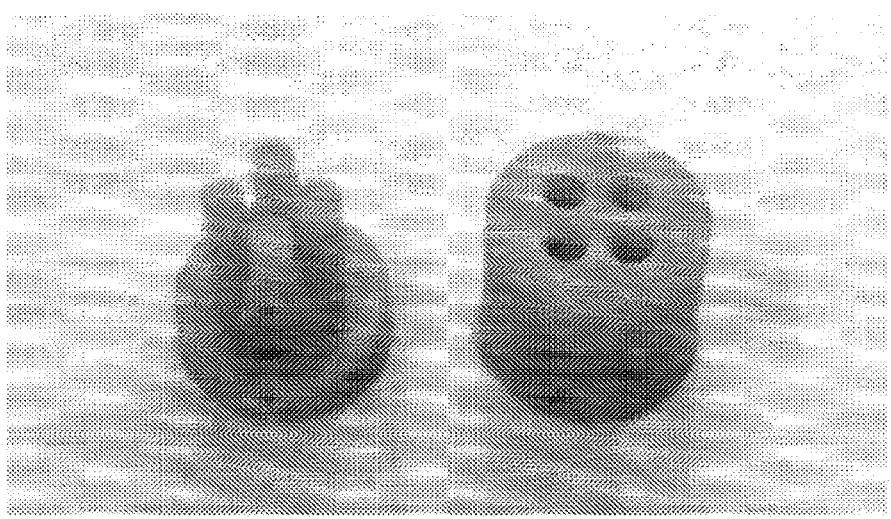
FIG. 15 shows a photograph of a resin mold according to Example 5.
Figure 16:
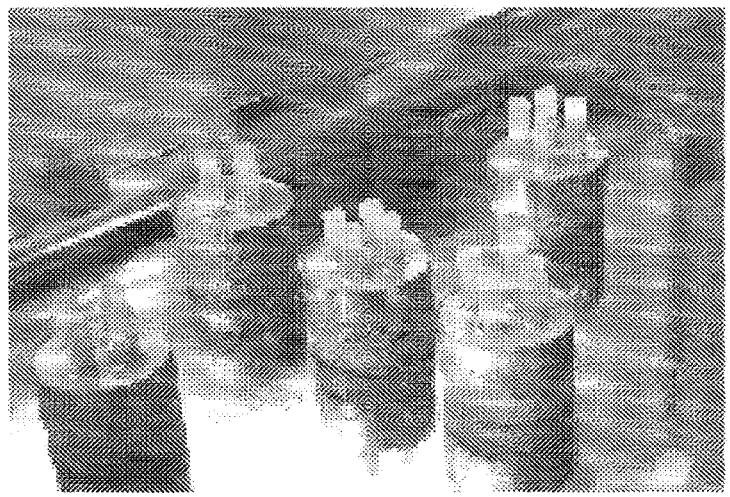
FIG. 16 shows a photograph of resin molds when taken out from metal molds according to Example 5.

Two resin molds each having an outer diameter ϕ of 10 shown in FIG. 15 were inserted into metal molds having an inner diameter ϕ of 10, and a metal powder was placed between the two resin molds. Next, a pressure of 250 MPa was applied to the inside of the metal molds. Thereafter, the resin molds filled with the metal powder shown in FIG. 16 were taken out from the metal molds, and the resin molds filled with the metal powder were heated in a furnace at 150° C. for 30 minutes. As a result, the resin molds were melted, and metal green compacts corresponding to the structure of the resin molds were molded.

Figure 17:
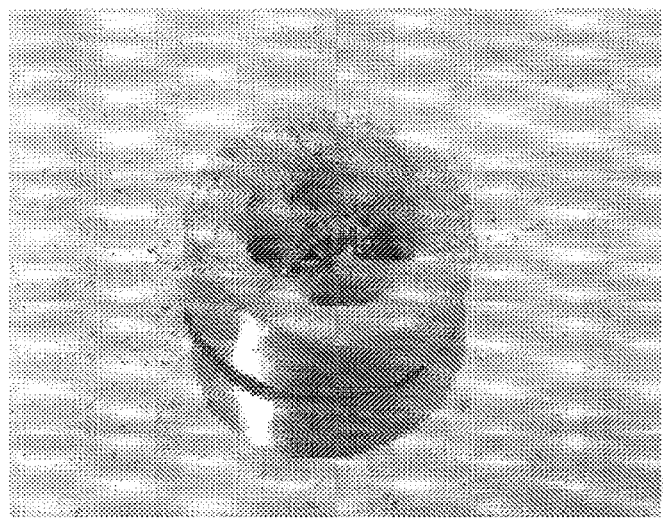
FIG. 17 shows a photograph of a metal solid obtained in Example 5.

A high-melting-point material made of 93 mass % of aluminum oxide ($Al_2O_3$) powder and 7 mass % of carbon (C) powder was prepared. The metal green compact was covered with the high-melting-point material. The high-melting-point material and the metal green compact were irradiated with 400 W of microwaves for 40 minutes under air atmosphere to heat the metal green compact to 1250° C. (estimate). FIG. 17 shows a photograph of a metal solid obtained by sintering the metal green compact.

Example 6

A metal powder made of carbon steel (S50C) was prepared, and a first prismatic metal green compact was molded at a pressure of 500 MPa. A high-melting-point material made of aluminum oxide ($Al_2O_3$) powder and carbon (C) powder was prepared. The first metal green compact was covered with the high-melting-point material. The high-melting-point material and the metal green compact were irradiated with 200 W of microwaves for 40 minutes under air atmosphere to heat the metal green compact to 400° C. (estimate), thereby obtaining a first metal solid.

Figure 18:
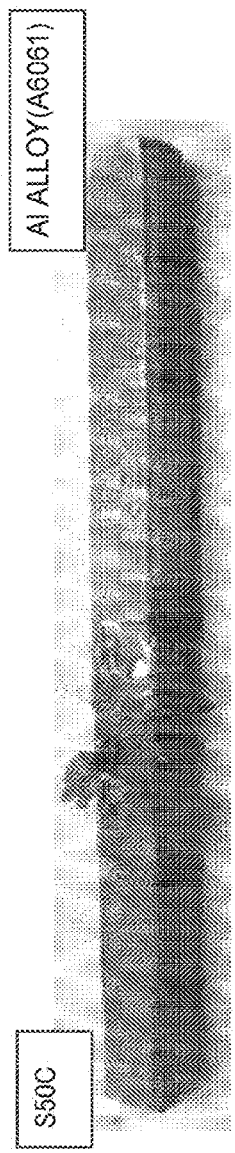
FIG. 18 shows a photograph of a metal solid obtained in Example 6.

A metal powder made of an aluminum alloy (A6061) was prepared, and a second prismatic metal green compact was molded at a pressure of 500 MPa. The second metal green compact was placed on the first metal solid, and the first metal solid and the second metal green compact were covered with the high-melting-point material. While applying a pressure of 5 MPa, the high-melting-point material and the metal green compact were irradiated with 200 W of microwaves under air atmosphere, and the microwave irradiation was stopped when the pressure dropped. As a result, a second metal solid in which the second metal green compact was sintered on the first metal solid was obtained. FIG. 18 shows a photograph of the second metal solid. It was confirmed that in the second metal solid, the interface between the portion that used to be the first metal green compact and the portion that used to be the second metal green compact was bonded without defects.

In the second metal solid, the surface of the portion made of an aluminum alloy (A6061) was carbonized to form aluminum carbide ($Al_4C_3$).

Example 7

Figure 19:
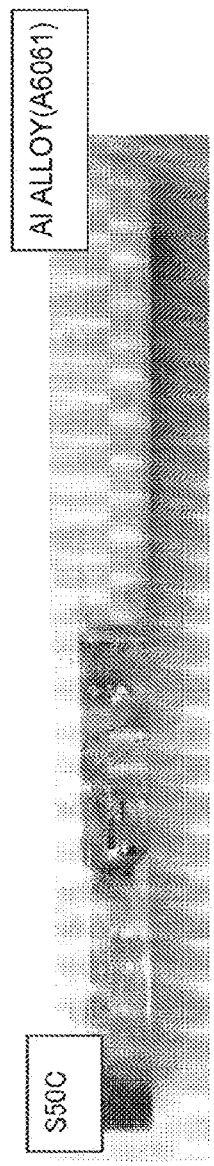
FIG. 19 shows a photograph of a metal solid obtained in Example 7.

A second metal solid was produced in the same manner as in Example 6, except that the high-melting-point material was made of aluminum oxide ($Al_2O_3$) powder and silicon carbide (SiC) powder. FIG. 19 shows a photograph of the second metal solid. It was confirmed that in the second metal solid, the interface between the portion that used to be the first metal green compact and the portion that used to be the second metal green compact was bonded without defects. In the second metal solid, the surface of the portion made of an aluminum alloy (A6061) was not carbonized. This indicated that by incorporating silicon carbide into the high-melting-point material, the surface of the produced metal solid was not carbonized.

REFERENCE SIGNS LIST

10 . . . stage, 20 . . . microwave irradiator, 31 . . . high-melting-point material placement unit, 32 . . . curable material addition unit, 33 . . . metal powder placement unit, 40 . . . curing device, 50 . . . uncured material remover, 60 . . . pressurizer, 101 . . . layer, 102 . . . portion, 103 . . . recess, 200 . . . metal powder

The invention claimed is:

1. A device for producing a metal solid, the device comprising:
    a stage on which a layer of a metal powder and a layer of a high-melting-point solid covering at least a portion of a periphery of the layer of the metal powder and having a melting point higher than the melting point of the metal powder are placed;
    a microwave irradiator configured to irradiate the metal powder, at least a portion of the periphery of which is covered with the high-melting-point solid, with microwaves to heat the metal powder, thereby sintering or melt-solidifying the metal powder;
    a high-melting-point solid placement unit configured to place the layer of the high-melting-point solid on the stage covering at least a portion of the periphery of the layer of the metal powder; and
    a metal powder placement unit configured to place the layer of the metal powder in a recess of the layer of the high-melting-point solid,
    wherein:
    in the at least a portion of the periphery covered with the high-melting-point solid, the metal powder and the high-melting-point solid are in contact with each other; and
    the high-melting-point solid includes a mixture of:
        an insulation material that has a lower degree of absorption of the microwaves than the metal powder; and
        an absorbent material that absorbs the microwaves in a temperature zone at least a portion of which is lower than a temperature zone in which the metal powder absorbs the microwaves.

2. The device according to claim 1, wherein the high-melting-point solid placement unit applies the high-melting-point solid directly onto the stage.

3. The device for producing a metal solid according to claim 1, wherein the high-melting-point solid placement unit laminates a layer of the high-melting-point solid on the stage.

4. The device according to claim 1, further comprising a curable material addition unit configured to add a curable liquid material to at least a portion of the high-melting-point solid.

5. The device according to claim 1, further comprising a curing unit configured to cure at least a portion of the high-melting-point solid.

6. The device according to claim 5, further comprising an uncured material remover configured to remove the high-melting-point solid that is uncured.

7. The device according to claim 1, wherein the metal powder placement unit is configured to place the periphery of the layer of the metal powder in contact with the layer of the high-melting-point solid on the stage.

8. The device according to claim 1, wherein the metal powder placement unit applies the metal powder directly onto the stage.

9. The device according to claim 1, further comprising a pressurizer configured to apply a pressure to the metal powder placed on the stage.

10. The device according to claim 9,
    wherein the pressurizer applies a pressure to the metal powder before the microwave irradiator irradiates the metal powder with the microwaves.

11. The device according to claim 9,
    wherein the pressurizer applies a pressure to the metal powder after the microwave irradiator irradiates the metal powder with the microwaves.

12. The device according to claim 1, further comprising an inert gas supplier that supplies an inert gas to the metal powder.

13. The device according to claim 1, further comprising a reducing gas supplier that supplies a reducing gas to the metal powder.

14. The device according to claim 1,
    wherein the device repeats:
    placing the metal powder and the high-melting-point solid on the stage by the high-melting-point solid placement unit and the metal powder placement unit; and
    sintering or melt-solidifying the metal powder by the microwave irradiator.

15. The device according to claim 1,
    wherein the metal powder includes a metal oxide; and
    the microwave irradiator further includes a reduction unit configured to reduce the metal oxide before the microwave irradiator irradiates the metal powder with the microwaves.

16. The device according to claim 1,
    wherein the high-melting-point solid includes from 1 mass % to 70 mass % of the absorbent material.

* * * * *